(12) United States Patent
Kinomura et al.

(10) Patent No.: US 9,467,001 B2
(45) Date of Patent: Oct. 11, 2016

(54) VEHICLE, CHARGING APPARATUS AND CHARGING SYSTEM

(75) Inventors: Shigeki Kinomura, Suntou-gun (JP); Tatsuwo Hatanaka, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/373,766

(22) PCT Filed: Feb. 22, 2012

(86) PCT No.: PCT/JP2012/054227
§ 371 (c)(1),
(2), (4) Date: Jul. 22, 2014

(87) PCT Pub. No.: WO2013/124978
PCT Pub. Date: Aug. 29, 2013

(65) Prior Publication Data
US 2015/0032315 A1    Jan. 29, 2015

(51) Int. Cl.
*B60L 11/18* (2006.01)
*H02J 7/00* (2006.01)
*B60L 3/00* (2006.01)

(52) U.S. Cl.
CPC .............. *H02J 7/007* (2013.01); *B60L 3/0069* (2013.01); *B60L 11/1811* (2013.01); *B60L 11/1824* (2013.01); *B60L 11/1838* (2013.01); *H02J 7/0004* (2013.01); *H02J 7/0027* (2013.01); *B60L 2240/622* (2013.01); *H02J 2007/005* (2013.01); *Y02T 10/7005* (2013.01); *Y02T 10/7055* (2013.01); *Y02T 10/7072* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01)

(58) Field of Classification Search
CPC ............ B60L 11/1809; B60L 11/1816; B60L 11/1824; B60L 11/1838; B60L 11/184; B60L 11/1846; B60L 11/1848; Y02T 10/7088; Y02T 90/14; H02J 7/007; H02J 7/0073; H02J 7/1446
USPC ......................................................... 701/22
See application file for complete search history.

(56) References Cited

U.S. PATENT DOCUMENTS

| | | | | |
|---|---|---|---|---|
| 8,384,358 B2* | 2/2013 | Biondo | .................... | H04Q 9/00 320/155 |
| 2009/0192655 A1 | 7/2009 | Ichikawa et al. | | |
| 2009/0210357 A1 | 8/2009 | Pudar et al. | | |
| 2009/0302801 A1 | 12/2009 | Katsunaga | | |
| 2010/0097036 A1* | 4/2010 | Wakayama | .................... | 320/153 |
| 2010/0164439 A1* | 7/2010 | Ido | ................ | 320/155 |

(Continued)

FOREIGN PATENT DOCUMENTS

EP    2551987 A1    1/2013
EP    2787597 A1    10/2014

(Continued)

*Primary Examiner* — Behrang Badii
*Assistant Examiner* — David Testardi
(74) *Attorney, Agent, or Firm* — Oliff PLC

(57) ABSTRACT

A vehicle-side executes a program including the steps of, if setting information is input, storing a charging schedule, and if a prescribed period of time has passed, performing an update process, performing a notification process, and if a charging cable is being connected, performing a reservation charging process.

9 Claims, 13 Drawing Sheets

<BEFORE UPDATE PROCESS>

| | RECEIPT NO. | START TIME | END TIME | DATE AND TIME OF INPUT |
|---|---|---|---|---|
| | — | 23:00 | 5:00 | — |
| INPUT WITH TERMINAL → | 1 | 22:30 | 4:30 | 12/01 17:00 |
| INPUT WITH MOBILE TERMINAL → | 2 | 22:00 | 4:00 | 12/01 14:00 |

<AFTER UPDATE PROCESS>

| RECEIPT NO. | START TIME | END TIME | DATE AND TIME OF INPUT |
|---|---|---|---|
| — | 22:30 | 4:30 | — |
| 1 | — | — | — |
| 2 | — | — | — |

(56) References Cited

U.S. PATENT DOCUMENTS

| | | |
|---|---|---|
| 2010/0217485 A1 | 8/2010 | Ichishi |
| 2010/0268411 A1 | 10/2010 | Taguchi |
| 2011/0022256 A1* | 1/2011 | Asada ............... B60L 11/1824 701/22 |
| 2011/0047102 A1* | 2/2011 | Grider et al. ............... 705/412 |
| 2011/0175569 A1* | 7/2011 | Austin ........................ 320/109 |
| 2011/0191220 A1* | 8/2011 | Kidston et al. ............... 705/34 |
| 2011/0202221 A1* | 8/2011 | Sobue et al. ................. 701/22 |
| 2011/0224852 A1* | 9/2011 | Profitt-Brown et al. ....... 701/22 |
| 2012/0049793 A1* | 3/2012 | Ross et al. .................. 320/109 |
| 2012/0049796 A1* | 3/2012 | Fukatsu ...................... 320/109 |
| 2012/0112696 A1* | 5/2012 | Ikeda et al. ................. 320/109 |
| 2012/0206099 A1* | 8/2012 | Ichikawa et al. ............ 320/109 |
| 2012/0293122 A1* | 11/2012 | Murawaka .................. 320/109 |
| 2013/0009599 A1 | 1/2013 | Yukizane et al. |
| 2013/0131911 A1* | 5/2013 | Smith et al. ................. 701/29.1 |
| 2013/0154561 A1* | 6/2013 | Gadh ................... H02J 7/0027 320/109 |

FOREIGN PATENT DOCUMENTS

| | | | |
|---|---|---|---|
| JP | H11-146505 A | 5/1999 | |
| JP | 2001117508 A * | 4/2001 | ............... G09F 9/00 |
| JP | 2006-074867 A | 3/2006 | |
| JP | A-2009-22061 | 1/2009 | |
| JP | 2009089474 A * | 4/2009 | |
| JP | A-2009-136109 | 6/2009 | |
| JP | 2009-296824 A | 12/2009 | |
| JP | 2010104114 A * | 5/2010 | |
| JP | A-2010-104114 | 5/2010 | |
| JP | 2010213373 A * | 9/2010 | |
| JP | A-2010-252449 | 11/2010 | |
| JP | A-2011-61952 | 3/2011 | |
| JP | A-2011-182588 | 9/2011 | |
| JP | 2011-254644 A | 12/2011 | |
| JP | 2012-085383 A | 4/2012 | |
| WO | WO 2011/073765 A2 * | 6/2011 | |
| WO | 2011/118187 A1 | 9/2011 | |
| WO | WO 2013/076792 A1 | 5/2013 | |

* cited by examiner

FIG.9

<BEFORE UPDATE PROCESS>

| RECEIPT NO. | START TIME | END TIME | DATE AND TIME OF INPUT |
|---|---|---|---|
| — | 23:00 | 5:00 | — |
| 1 | 22:30 | 4:30 | 12/01 17:00 |
| 2 | 22:00 | 4:00 | 12/01 14:00 |

INPUT WITH TERMINAL → (row 1)
INPUT WITH MOBILE TERMINAL → (row 2)

⇩

<AFTER UPDATE PROCESS>

| RECEIPT NO. | START TIME | END TIME | DATE AND TIME OF INPUT |
|---|---|---|---|
| — | 22:30 | 4:30 | — |
| 1 | — | — | — |
| 2 | — | — | — |

# VEHICLE, CHARGING APPARATUS AND CHARGING SYSTEM

TECHNICAL FIELD

The present invention relates to a technique of charging a vehicle-mounted power storage device using a power supply outside of a vehicle in accordance with a charging schedule.

BACKGROUND ART

Japanese Patent Laying-Open No. 2009-136109 (PTD 1) and Japanese Patent Laying-Open No. 2010-104114 (PTD 2) each disclose a charging control apparatus for charging a vehicle-mounted power storage device using a power supply outside of a vehicle in accordance with a charging schedule.

CITATION LIST

Patent Documents

PTD 1: Japanese Patent Laying-Open No. 2009-136109
PTD 2: Japanese Patent Laying-Open No. 2010-104114

SUMMARY OF INVENTION

Technical Problem

If charging schedules are created in a plurality of devices, however, it is challenging to determine how to handle the plurality of created charging schedules.

An object of the present invention is to provide a vehicle, a charging apparatus and a charging system performing charging control of a vehicle-mounted power storage device using an external power supply by appropriately adjusting charging schedules created in a plurality of devices.

Solution to Problem

A vehicle according to one aspect of the present invention includes a rotating electric machine mounted on the vehicle, a power storage device (150) for supplying electric power to the rotating electric machine, and a control device for charging the power storage device of the vehicle using an external power supply in accordance with a latest charging schedule out of a plurality of charging schedules, when information about the plurality of charging schedules is received from a plurality of devices capable of receiving information about a charging schedule of the power storage device.

Preferably, the control device allows charging and discharging of the power storage device within a range where completion of the charging in accordance with the latest charging schedule is ensured.

More preferably, the control device selects a last received charging schedule out of the plurality of charging schedules as the latest charging schedule.

More preferably, the control device selects a last created charging schedule out of the plurality of charging schedules as the latest charging schedule.

More preferably, the control device creates the charging schedule based on a state of the vehicle, and when the charging schedule created based on a state of the vehicle and the latest charging schedule do not match, notifies a user of the vehicle that they do not match.

More preferably, the control device performs, when a time measured by at least one of the plurality of devices is incorrect, a process of correcting the time.

A charging apparatus according to another aspect of the present invention is a charging apparatus for performing charging control on a power storage device of a vehicle using a power supply outside of the vehicle, the vehicle including a rotating electric machine and the power storage device for supplying electric power to the rotating electric machine. The charging apparatus includes an input device for receiving information about a charging schedule of the power storage device from a plurality of devices, and a control device for charging the power storage device using the power supply in accordance with a latest charging schedule out of a plurality of charging schedules, when information about the plurality of charging schedules of the power storage device is received from the plurality of devices.

More preferably, the charging apparatus is connected to the vehicle and an electrical device different from the vehicle. The control device performs the charging control on the power storage device in accordance with the charging schedule, and performs a process of managing supply and demand of electric power of the electrical device.

Preferably, the control device allows charging and discharging of the power storage device within a range where completion of the charging in accordance with the latest charging schedule is ensured.

More preferably, the control device selects a last received charging schedule out of the plurality of charging schedules as the latest charging schedule.

More preferably, the control device selects a last created charging schedule out of the plurality of charging schedules as the latest charging schedule.

More preferably, the control device selects the charging schedule received from the vehicle when the latest charging schedule is unclear.

More preferably, when the charging schedule created based on a state of the vehicle and the latest charging schedule do not match, the control device notifies a user of the vehicle that they do not match.

A charging system according to yet another aspect of the present invention includes a vehicle including a rotating electric machine and a power storage device for supplying electric power to the rotating electric machine, a charging apparatus for charging the power storage device using a power supply outside of the vehicle, a plurality of devices for receiving information about a charging schedule of the power storage device from a user, and a control device for charging the power storage device using the power supply in accordance with a latest charging schedule out of a plurality of charging schedules, when the plurality of charging schedules are created by input of the information to the plurality of devices by the user.

Advantageous Effects of Invention

According to the present invention, the vehicle-mounted power storage device is charged by the power supply outside of the vehicle in accordance with the latest charging schedule out of the plurality of charging schedules received from the plurality of devices, to thereby perform charging in accordance with a charging schedule intended by the user. Thus, a vehicle, a charging apparatus and a charging system performing charging control of a vehicle-mounted power storage device using an external power supply by appropriately adjusting charging schedules created in a plurality of devices can be provided.

BRIEF DESCRIPTION OF DRAWINGS

FIG. 9 is a diagram illustrating a variation (No. 1) of the update process.

DESCRIPTION OF EMBODIMENTS

Figure 1:
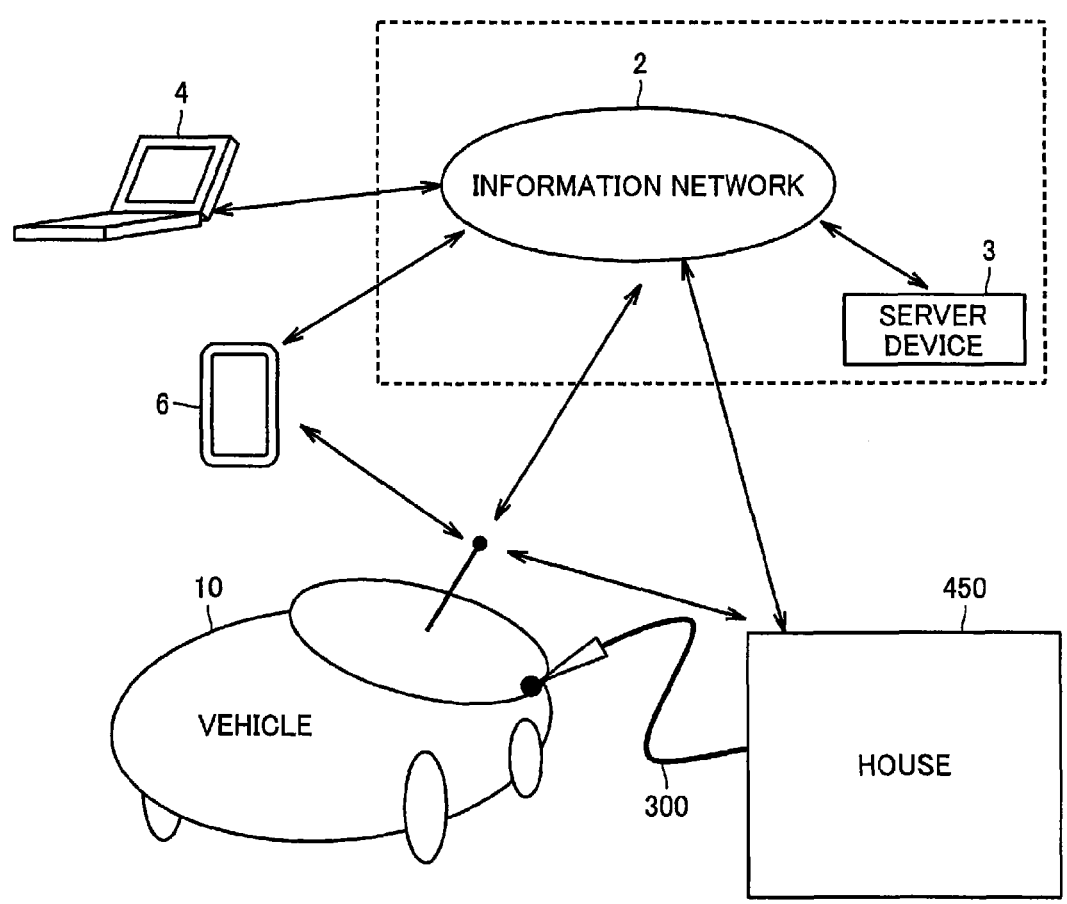
FIG. 1 is a diagram illustrating an overall configuration of a charging system according to an embodiment.

Embodiments of the present invention will be described hereinafter with reference to the drawings, in which the same components are designated by the same reference characters, and their names and functions are also identical. Thus, the detailed description thereof will not be repeated.

First Embodiment

As shown in FIG. 1, a charging system 1 according to this embodiment includes a vehicle 10, a house 450 serving as a charging apparatus provided outside vehicle 10, and a terminal 4 and a mobile terminal 6 for conducting communication with vehicle 10 or house 450.

Examples of terminal 4 include a terminal installed in a specific position such as a PC (Personal Computer). Examples of mobile terminal 6 include a portable terminal such as a smartphone, a cell phone, a PDA (Personal Digital Assistant) or a tablet terminal. Charging system 1 is only required to include at least one of terminal 4 and mobile terminal 6.

Vehicle 10 and house 450 are connected together by a charging cable 300. Each of terminal 4, mobile terminal 6, vehicle 10 and house 450 is connected to an information network 2. Information network 2 is a computer network such as the Internet.

Terminal 4 provides and receives information through wired communication or wireless communication to and from another device (vehicle 10 or house 450) via information network 2. Terminal 4 may provide and receive information through wireless communication to and from another device without information network 2.

Mobile terminal 6 provides and receives information through wireless communication to and from another device (vehicle 10 or house 450) via information network 2. Mobile terminal 6 may provide and receive information through wireless communication to and from another device without information network 2.

Vehicle 10 provides and receives information through wireless communication to and from another device (terminal 4, mobile terminal 6 or house 450) via information network 2. Vehicle 10 may provide and receive information through wireless communication to and from another device without information network 2.

House 450 provides and receives information through wired communication or wireless communication to and from another device (terminal 4, mobile terminal 6 or vehicle 10) via information network 2. House 450 may provide and receive information through wireless communication to and from another device without information network 2.

In this embodiment, vehicle 10 is a vehicle capable of running with electric power from a power storage device. For example, vehicle 10 is a hybrid vehicle or an electric vehicle. Vehicle 10 is not particularly limited as long as it incorporates a power storage device, and may be, for example, a vehicle incorporating an internal combustion engine or a vehicle incorporating a fuel cell.

House 450 functions, when connected to vehicle 10 by charging cable 300, as a charging apparatus for charging the power storage device mounted on vehicle 10 using a system power supply and the like. House 450 includes an electrical load different from vehicle 10. For example, the electrical load includes at least one of electrical devices such as a television, an air conditioner, a washing machine and a refrigerator. House 450 manages provision and reception of electric power to and from the power storage device mounted on vehicle 10, as well as supply and demand of electric power such as a state of supply of electric power to the electrical load and a state of use of the electrical load.

Although house 450 is described as an example of the charging apparatus for charging the power storage device of vehicle 10 in this embodiment, a station dedicated to charging or a building other than house 450 that includes a charging apparatus may be used, for example.

Although vehicle 10, terminal 4, mobile terminal 6 and house 450 are described as a configuration connected together via information network 2 such as the Internet in this embodiment, information network 2 may be a network in the form of cloud computing including at least one or more server devices 3 as indicated by a box enclosed with a broken line in FIG. 1, for example.

Server device 3 is provided in a position different from house 450. Server device 3 includes at least a CPU and a storage medium, and performs a software process by causing the CPU to execute a program stored in the storage medium.

Figure 2:
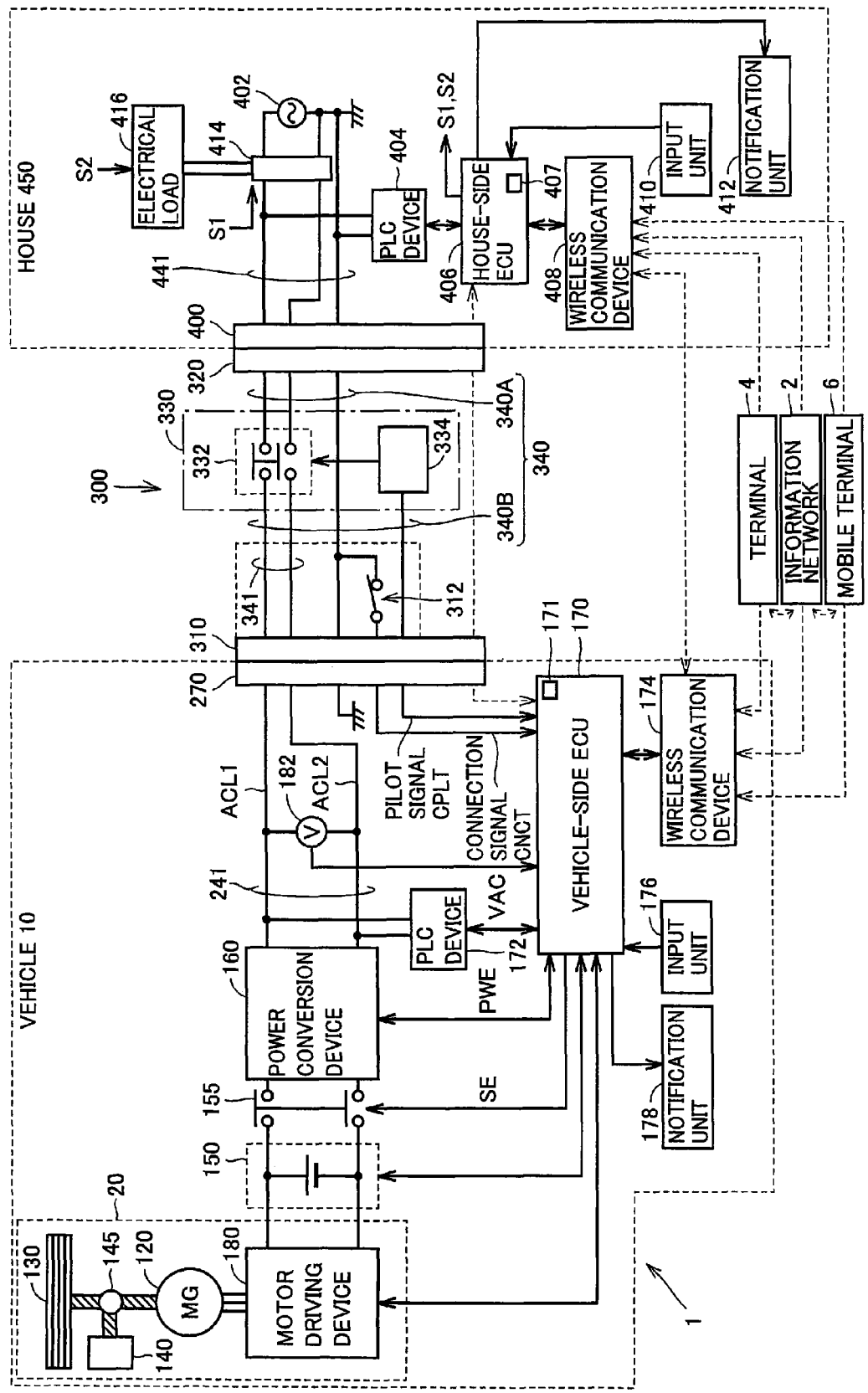
FIG. 2 is a diagram (No. 1) illustrating a detailed configuration of the charging system of FIG. 1.

As shown in FIG. 2, vehicle 10 includes an inlet 270, a power conversion device 160, a relay 155, a power storage device 150, a driving unit 20, a vehicle-side ECU (Electronic Control Unit) 170, a first PLC (Power Line Communications) device 172, a wireless communication device 174, an input unit 176, a notification unit 178, and a voltage sensor 182.

Driving unit 20 includes a motor driving device 180, a motor generator (hereinafter also referred to as "MG") 120, a drive wheel 130, an engine 140, and a power split device 145.

Inlet 270 is connected to a connector 310 provided in charging cable 300.

Power conversion device 160 is connected to inlet 270 by power lines ACL1 and ACL2. Power conversion device 160 is connected to power storage device 150 through relay 155. In response to a control signal PWE from vehicle-side ECU 170, power conversion device 160 converts AC power supplied from a system power supply 402 of house 450 to DC power capable of charging power storage device 150, and supplies the DC power to power storage device 150.

Power storage device 150 is an electric power storage component configured in a chargeable/dischargeable manner. For example, power storage device 150 includes a secondary battery such as a lithium-ion battery, a nickel-metal hydride battery or a lead-acid battery, or a power storage element such as an electric double layer capacitor.

Power storage device 150 stores the DC power supplied from power conversion device 160. Power storage device 150 is connected to motor driving device 180 that drives MG 120. Power storage device 150 supplies DC power used for the generation of driving power for running the vehicle. Power storage device 150 stores electric power generated by MG 120.

Although not shown, power storage device 150 further includes a voltage sensor for detecting a voltage of power storage device 150, and a current sensor for detecting a current input to and output from power storage device 150. The voltage sensor transmits a signal indicating a detected voltage to vehicle-side ECU 170. The current sensor transmits a signal indicating a detected current to vehicle-side ECU 170.

Motor driving device 180 is connected to power storage device 150 and MG 120. Motor driving device 180 is controlled by vehicle-side ECU 170, and converts electric power supplied from power storage device 150 to electric power for driving MG 120. Motor driving device 180 includes a three-phase inverter, for example.

MG 120 is connected to motor driving device 180, and to drive wheel 130 with power split device 145 interposed therebetween. MG 120 receives the electric power supplied from motor driving device 180, to generate driving power for running vehicle 10. MG 120 also receives a torque from drive wheel 130 and generates AC power, to generate regenerative braking power. Vehicle-side ECU 170 controls the regenerative braking power by transmitting to motor driving device 180 a regenerative torque command value which is generated in accordance with a state of vehicle 10. MG 120 is, for example, a three-phase AC motor generator including a rotor into which a permanent magnet is embedded, and a stator having a Y-connected three-phase coil.

MG 120 is also connected to engine 140 with power split device 145 interposed therebetween. Vehicle-side ECU 170 controls vehicle 10 such that a ratio of driving power of engine 140 and MG 120 is optimal. MG 120 is driven by engine 140 to operate as a power generator. Electric power generated by MG 120 is stored in power storage device 150. The electric power generated by MG 120 may be supplied together with the electric power in power storage device 150 through inlet 270 to electrical devices connected to system power supply 402 of house 450.

Voltage sensor 182 is connected between power lines ACL1 and ACL2, and detects a voltage VAC between power lines ACL1 and ACL2. Voltage sensor 182 transmits a signal indicating voltage VAC to vehicle-side ECU 170.

Relay 155 is inserted into a path that connects power conversion device 160 to power storage device 150. Relay 155 is controlled by a control signal SE from vehicle-side ECU 170, and switches between supply and interruption of electric power between power conversion device 160 and power storage device 150. Although relay 155 is provided separately from power storage device 150 or power conversion device 160 in this embodiment, it may be included in power storage device 150 or power conversion device 160.

Vehicle-side ECU 170 includes a CPU (Central Processing Unit) (not shown in FIG. 2), and a memory 171 having the function of a storage device, an input/output buffer or the like. Vehicle-side ECU 170 receives signals from various sensors and the like and transmits control commands to various devices, and controls vehicle 10 and the various devices. Such control is not limited to a software process, but may be processed by constructing dedicated hardware (electronic circuitry).

Vehicle-side ECU 170 receives a connection signal CNCT and a pilot signal CPLT through inlet 270 from charging cable 300. Vehicle-side ECU 170 receives a detection value of voltage VAC from voltage sensor 182.

Vehicle-side ECU 170 receives detection values of current, voltage and temperature from sensors (not shown) provided in power storage device 150, and calculates an SOC (State of Charge) indicating a remaining amount of power in power storage device 150.

Based on these pieces of information, vehicle-side ECU 170 controls power conversion device 160, relay 155 and the like so as to charge power storage device 150.

First PLC device 172 is connected to power lines 241. First PLC device 172 conducts power line communication with a second PLC device 404 connected to power lines 441 of house 450. In the power line communication between first PLC device 172 and second PLC device 404, power lines 241, 341 and 441 are utilized as communication paths. The power line communication between first PLC device 172 and second PLC device 404 becomes possible when charging cable 300 is connected to both vehicle 10 and house 450, namely, when an outlet 400 and a plug 320 are connected together and connector 310 and inlet 270 are connected together.

First PLC device 172 includes a modem, for example. When first PLC device 172 receives a high-frequency signal through power lines 241 from second PLC device 404 of house 450, first PLC device 172 demodulates data from the received high-frequency signal. First PLC device 172 transmits the demodulated data to vehicle-side ECU 170.

When first PLC device 172 receives data from vehicle-side ECU 170, first PLC device 172 modulates the received data into a high-frequency signal. First PLC device 172 outputs the modulated high-frequency signal to power lines 241.

If the AC power of system power supply 402 has a frequency of 50 Hz or 60 Hz, for example, the high-frequency signal exchanged between first PLC device 172 and second PLC device 404 during the power communication has a frequency of several MHz to several tens of MHz, for example.

Wireless communication device 174 conducts wireless communication with a device outside of vehicle 10. In this embodiment, wireless communication device 174 conducts wireless communication with at least one of terminal 4, mobile terminal 6, and a wireless communication device 408 in house 450.

Although wireless communication standards such as Zigbee (registered trademark), Bluetooth (registered trademark), IEEE 802.11, or infrared communication and the like are used in the wireless communication, these standards are not particularly limiting.

Input unit 176 is an interface for receiving instructions from a user in vehicle 10. Input unit 176 transmits a signal corresponding to an instruction received from the user to vehicle-side ECU 170.

In this embodiment, input unit 176 receives input of information (hereinafter also referred to as setting information) about a start time and/or an end time of external charging desired by the user (hereinafter referred to as a charging schedule), for example. The setting information is information for specifying the charging schedule, and may be the charging schedule itself, only the start time, or only the end time. In this embodiment, the external charging refers to charging of power storage device 150 of vehicle 10 using system power supply 402. Operation of the external charging in accordance with the charging schedule will be described later.

The information about the charging schedule can be input by, for example, operation of directly inputting a numerical value corresponding to the time, operation of changing a time displayed on a display device to a desired time, operation of selecting one of a plurality of times displayed on the display device, operation with a remote controller, or the like.

Input unit 176 may consist of a button, a dial and the like, may consist of an icon and the like displayed on a touch panel, or may be a reception device that receives data including information about a charging schedule from a remote controller, for example.

In this embodiment, vehicle-side ECU 170 determines a charging schedule based on the setting information received by input unit 176, and causes memory 171 to store the determined charging schedule. Vehicle-side ECU 170 may determine a charging schedule based on the setting information from terminal 4 received by wireless communication device 174, and cause memory 171 to store the determined charging schedule. Vehicle-side ECU 170 may determine a charging schedule based on the setting information from mobile terminal 6 received by wireless communication device 174, and cause memory 171 to store the determined charging schedule. Alternatively, vehicle-side ECU 170 may determine a charging schedule based on the setting information from house 450 received by wireless communication device 174, and cause memory 171 to store the determined charging schedule.

If a start time is input as the setting information by the user, for example, vehicle-side ECU 170 calculates an end time based on the input start time and a charged amount required to reach a target SOC during charging (e.g., an SOC corresponding to a fully charged state) from the current SOC. Vehicle-side ECU 170 causes memory 171 to store the calculated charging schedule.

Alternatively, if an end time is input as the setting information by the user, vehicle-side ECU 170 calculates a start time based on the input end time and a charged amount required to reach the target SOC during charging from the current SOC. Vehicle-side ECU 170 causes memory 171 to store the calculated charging schedule.

Alternatively, if a start time and an end time are input as the setting information by the user, vehicle-side ECU 170 causes memory 171 to store the input start time and end time as a charging schedule.

Notification unit 178 notifies the user in vehicle 10 of prescribed information. In this embodiment, notification unit 178 notifies the user of the prescribed information by using a display device consisting of an LCD (Liquid Crystal Display), an LED (Light Emitting Diode) and the like. Notification unit 178 may notify the user of the prescribed information by, for example, using a sound generation device that generates sound or voice.

Charging cable 300 includes connector 310 provided at the end closer to the vehicle, plug 320 provided at the end closer to the system power supply, a charging circuit interrupt device (hereinafter also referred to as "CCID") 330, and a power line portion 340 that connects the various devices together to input and output electric power and control signals. Charging cable 300 may be included in vehicle 10 or in house 450.

Power line portion 340 includes a power line portion 340A that connects plug 320 and CCID 330 together, and a power line portion 340B that connects connector 310 and CCID 330 together. Power line portion 340 also includes power lines 341 for supplying the electric power from system power supply 402.

Plug 320 of charging cable 300 is connected to outlet 400 of system power supply 402 of house 450 when external charging is performed. Connector 310 of charging cable 300 is connected to inlet 270 provided on the body of vehicle 10 when external charging is performed. When plug 320 and outlet 400 are connected together and connector 310 and inlet 270 are connected together, the electric power from system power supply 402 is supplied to vehicle 10. Plug 320 can be attached to and removed from outlet 400. Connector 310 can be attached to and removed from inlet 270.

Connector 310 includes a connection detection circuit 312 therein. Connection detection circuit 312 detects a connection state between inlet 270 and connector 310. Connection detection circuit 312 transmits connection signal CNCT indicating the connection state through inlet 270 to vehicle-side ECU 170 of vehicle 10.

Connection detection circuit 312 may be configured as a limit switch as shown in FIG. 2, such that the potential of connection signal CNCT becomes a ground potential (0V) when connector 310 is connected to inlet 270. Alternatively, connection detection circuit 312 may be configured as a resistor (not shown) having a prescribed resistance value, such that the potential of connection signal CNCT decreases to a prescribed potential upon connection. In either case, vehicle-side ECU 170 detects that connector 310 has been connected to inlet 270 by detecting the potential of connection signal CNCT.

CCID 330 includes a CCID relay 332 and a control pilot circuit 334. CCID relay 332 is inserted into power lines 341 in charging cable 300. CCID relay 332 is controlled by control pilot circuit 334. When CCID relay 332 is opened, an electrical path of power lines 341 is interrupted. When CCID relay 332 is closed, on the other hand, electric power is supplied from system power supply 402 to vehicle 10.

Control pilot circuit 334 outputs pilot signal CPLT to vehicle-side ECU 170 through connector 310 and inlet 270. This pilot signal CPLT is a signal for notifying vehicle-side ECU 170 of a rated current of charging cable 300 from control pilot circuit 334. Pilot signal CPLT is also used as a signal for remotely controlling CCID relay 332 from vehicle-side ECU 170 based on the potential of pilot signal CPLT which is controlled by vehicle-side ECU 170. Control pilot circuit 334 controls CCID relay 332 based on potential variation in pilot signal CPLT.

The aforementioned pilot signal CPLT and connection signal CNCT, and the configurations such as the shapes and the terminal arrangement of inlet 270 and connector 310 are standardized, for example, by the SAE (Society of Automotive Engineers) of the United States of America and the Japan Electric Vehicle Association.

House 450 includes outlet 400, system power supply 402, second PLC device 404, a house-side ECU 406, wireless communication device 408, an input unit 410, a notification unit 412, a switching unit 414, an electrical load 416, and power lines 441.

In this embodiment, system power supply 402 and house-side ECU 406 in house 450 correspond to a charging apparatus for externally charging power storage device 150 of vehicle 10 in a manner coordinated with vehicle-side ECU 170. This charging apparatus is part of an electric power management system for adjusting an amount of power used by at least one of the plurality of electrical devices connected to system power supply 402 in house 450.

Although system power supply 402 is described as an AC power supply in this embodiment, it may be a DC power supply, for example.

Second PLC device 404 is connected to power lines 441. Second PLC device 404 conducts power line communication with first PLC device 172.

Second PLC device 404 includes a modem, for example. When second PLC device 404 receives a high-frequency signal through power lines 441 from first PLC device 172 of vehicle 10, second PLC device 404 demodulates data from the received high-frequency signal. Second PLC device 404 transmits the demodulated data to house-side ECU 406.

When second PLC device 404 receives data from house-side ECU 406, second PLC device 404 modulates the received data into a high-frequency signal. Second PLC device 404 outputs the modulated high-frequency signal to power lines 441.

House-side ECU 406 includes a CPU (not shown), and a memory 407 having the function of a storage device, an input/output buffer or the like. When communication with vehicle-side ECU 170 becomes possible, house-side ECU 406 receives signals from various sensors and the like provided in vehicle 10 and outputs control commands to various devices mounted on vehicle 10 through vehicle-side ECU 170, and controls the various devices. Such control is not limited to a software process, but may be processed by constructing dedicated hardware (electronic circuitry).

Wireless communication device 408 conducts wireless communication with a device outside or inside of house 450. In this embodiment, wireless communication device 408 conducts wireless communication with wireless communication device 174 of vehicle 10.

The communication between vehicle-side ECU 170 and house-side ECU 406 may be conducted when outlet 400 and plug 320 are connected together and connector 310 and inlet 270 are connected together, or when vehicle 10 and house 450 are within an area where they can communicate with each other.

In this embodiment, vehicle-side ECU 170 and house-side ECU 406 operate to perform external charging when outlet 400 and plug 320 are connected together and connector 310 and inlet 270 are connected together.

Vehicle-side ECU 170 and house-side ECU 406 may conduct wireless communication using wireless communication device 174 and wireless communication device 408, when outlet 400 and plug 320 are connected together and connector 310 and inlet 270 are connected together.

Alternatively, vehicle-side ECU 170 and house-side ECU 406 may conduct power line communication using first PLC device 172 and second PLC device 404, when outlet 400 and plug 320 are connected together and connector 310 and inlet 270 are connected together.

Alternatively, vehicle-side ECU 170 and house-side ECU 406 may communicate with each other by combining the aforementioned wireless communication and power line communication, when outlet 400 and plug 320 are connected together and connector 310 and inlet 270 are connected together.

Alternatively, vehicle-side ECU 170 and house-side ECU 406 may conduct wireless communication via information network 2, when outlet 400 and plug 320 are connected together and connector 310 and inlet 270 are connected together, or after outlet 400 and plug 320 are connected together or connector 310 and inlet 270 are connected together.

A communication method between vehicle 10 and house 450 is not particularly limited to the aforementioned methods. For example, as indicated by a broken line in FIG. 2, a communication line that passes through and connects inlet 270, connector 310, plug 320 and outlet 400 together may be provided between vehicle-side ECU 170 and house-side ECU 406. Vehicle-side ECU 170 and house-side ECU 406 may communicate with each other using this communication line, when outlet 400 and plug 320 are connected together and connector 310 and inlet 270 are connected together.

Input unit 410 is an interface for receiving instructions from the user in house 450. Input unit 410 transmits a signal corresponding to a received instruction to house-side ECU 406.

In this embodiment, input unit 410 receives input of, for example, information about a charging schedule from the user. The information about a charging schedule can be input by, for example, operation of directly inputting a numerical value corresponding to the time, operation of changing a time displayed on a display device to a desired time, operation of selecting one of a plurality of times displayed on the display device, operation with a remote controller or a mobile terminal, or the like.

Input unit 410 may consist of a button, a dial and the like, may consist of an icon and the like displayed on a touch panel, or may be a reception device that receives data including information about a charging schedule from a remote controller or a mobile terminal, for example.

In this embodiment, house-side ECU 406 determines a charging schedule based on the signal received by input unit 410, and causes memory 407 to store the determined charging schedule.

Notification unit 412 notifies the user in house 450 of prescribed information. In this embodiment, notification unit 412 notifies the user of the prescribed information by using a display device consisting of an LCD, an LED and the like. Notification unit 178 may notify the user of the prescribed information by, for example, using a sound generation device that generates sound or voice.

In response to a control signal S1 from house-side ECU 406, switching unit 414 switches between a first state where electrical load 416 and system power supply 402 are connected to power lines 441 in parallel with each other and a second state where system power supply 402 is disconnected.

In the first state, the electric power from system power supply 402 is supplied to electrical load 416. The electric power from system power supply 402 may also be supplied to vehicle 10 when outlet 400 and plug 320 are connected together and connector 310 and inlet 270 are connected together.

In the second state, on the other hand, vehicle 10 serves as a power supply of electrical load 416. Specifically, house-side ECU 406 controls the power conversion device through vehicle-side ECU 170 such that the DC power in power storage device 150 is converted to AC power, and controls CCID relay 332 such that the converted AC power is supplied to electrical load 416 through power lines 241, 341 and 441.

Electrical load 416 is an electrical device installed in house 450 or on a premise of house 450. The operation of electrical load 416 may be controlled in response to a control signal S2 from house-side ECU 406, for example, such that power consumption and the like of electrical load 416 are adjusted. House-side ECU 406 may control switching unit 414 such that switching from the first state to the second state takes place, for example, during a prescribed period of time that covers partially or completely a time period including the peak of electric power demand of a supplier (e.g., an electric power company) of system power supply 402.

Figure 3:
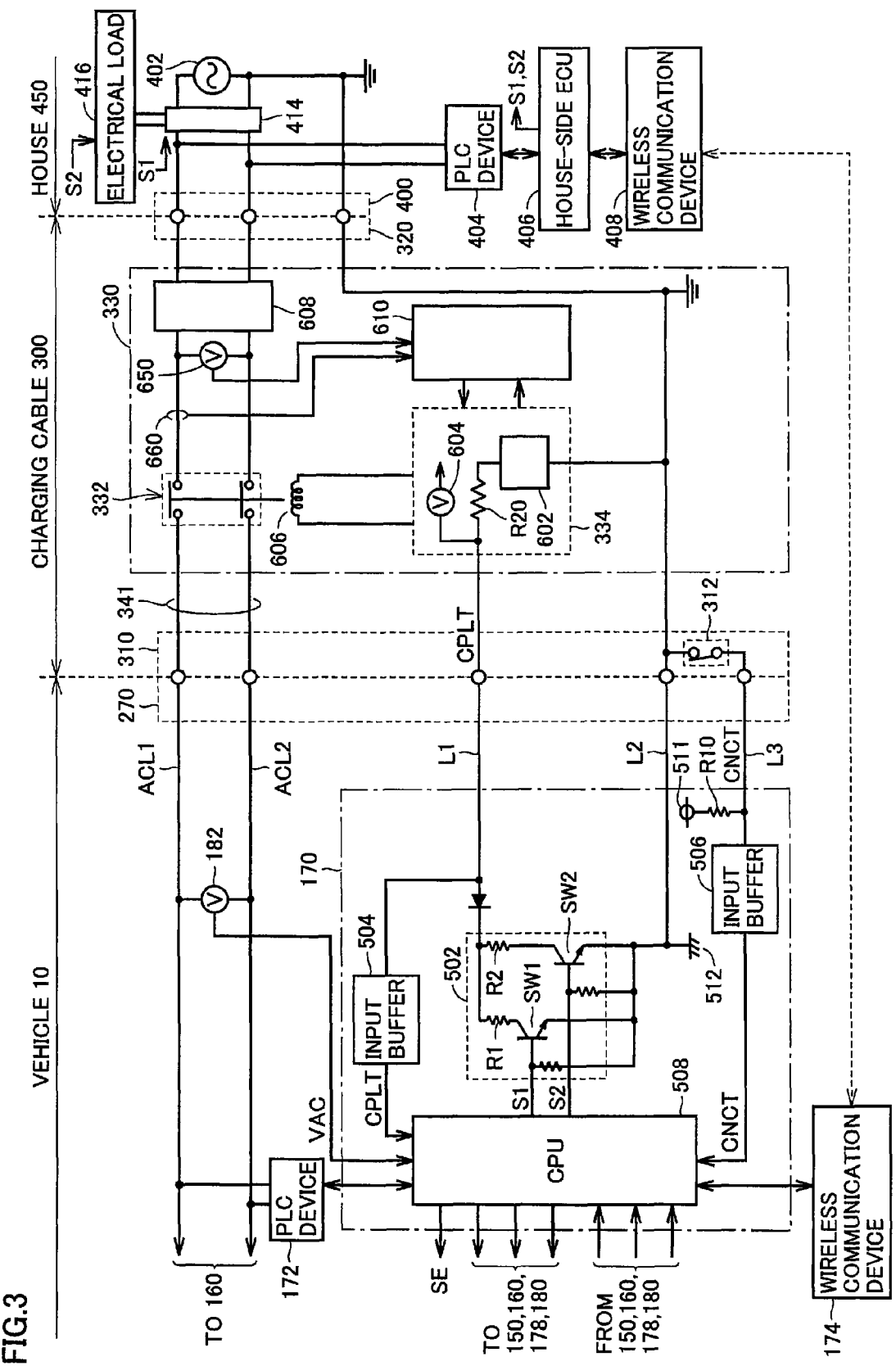
FIG. 3 is a diagram (No. 2) illustrating a detailed configuration of the charging system of FIG. 1.

FIG. 3 is a diagram illustrating the configurations of vehicle 10 and house 450 shown in FIG. 2 in more detail. The description of the elements in FIG. 3 designated by the same reference characters as in FIG. 2 will not be repeated.

Referring to FIG. 3, CCID 330 includes, in addition to CCID relay 332 and control pilot circuit 334, an electromagnetic coil 606, a leakage detector 608, a CCID control unit 610, a voltage sensor 650 and a current sensor 660. Control pilot circuit 334 includes an oscillation device 602, a resistance R20, and a voltage sensor 604.

Although not shown, CCID control unit 610 includes a CPU, a storage device, and an input/output buffer. CCID control unit 610 inputs and outputs signals to and from the various sensors and control pilot circuit 334, and controls charging operation of charging cable 300.

When the potential of pilot signal CPLT which is detected by voltage sensor 604 is a predetermined potential (e.g., 12V), oscillation device 602 outputs a non-oscillating signal. When the potential of pilot signal CPLT decreases from the above predetermined potential (e.g., 9V), oscillation device 602 is controlled by CCID control unit 610 to output a signal oscillating at a predetermined frequency (e.g., 1 kHz) and duty cycle.

The potential of pilot signal CPLT is controlled by vehicle-side ECU 170, as will be described later in FIG. 4. The duty cycle is set based on the rated current that can be supplied from system power supply 402 to vehicle 10 through charging cable 300.

As described above, when the potential of pilot signal CPLT decreases from the predetermined potential, pilot signal CPLT oscillates in a predetermined cycle. A pulse width of pilot signal CPLT is set based on the rated current that can be supplied from system power supply 402 to vehicle 10 through charging cable 300. That is, by means of a duty represented by a ratio of the pulse width to the oscillation cycle, control pilot circuit 334 notifies vehicle-side ECU 170 of vehicle 10 of the rated current by using pilot signal CPLT.

A rated current is determined for each specification of charging cable 300, and varies with the type of charging cable 300. Accordingly, the duty of pilot signal CPLT also varies with each charging cable 300.

Based on the duty of pilot signal CPLT received through a control pilot line L1, vehicle-side ECU 170 can detect the rated current that can be supplied to vehicle 10 through charging cable 300.

When the potential of pilot signal CPLT further decreases (e.g., 6V) by vehicle-side ECU 170, control pilot circuit 334 supplies a current to electromagnetic coil 606. In response to the current supply from control pilot circuit 334, electromagnetic coil 606 generates an electromagnetic force, and closes the contacts of CCID relay 332 to render CCID relay 332 conducting.

Leakage detector 608 is provided on power lines 341 of charging cable 300 within CCID 330, and detects the presence or absence of leakage. Specifically, leakage detector 608 detects a balance of currents flowing through a pair of power lines 341 in opposite directions, and detects that leakage has occurred when the balance is disturbed. Although not particularly shown, when leakage is detected by leakage detector 608, power feeding to electromagnetic coil 606 is interrupted, and the contacts of CCID relay 332 are opened to render CCID relay 332 non-conducting.

When plug 320 is inserted into outlet 400, voltage sensor 650 detects a power supply voltage supplied from system power supply 402, and transmits a detection value to CCID control unit 610. Current sensor 660 detects a charging current flowing through power lines 341, and transmits a detection value to CCID control unit 610.

Connection detection circuit 312 included in connector 310 is a limit switch, for example, as described above, whose contacts are closed when connector 310 is connected to inlet 270 and are opened when connector 310 is disconnected from inlet 270.

When connector 310 is disconnected from inlet 270, a voltage signal determined by a voltage of a power supply node 511 and a pull-up resistor R10 included in vehicle-side ECU 170 is generated as connection signal CNCT on a connection signal line L3. When connector 310 is connected to inlet 270, connection signal line L3 is short-circuited with a ground line L2, causing the potential of connection signal line L3 to be the ground potential (0V).

Connection detection circuit 312 may be a resistor (not shown). In this case, when connector 310 is connected to inlet 270, a voltage signal determined by a voltage of power supply node 511, pull-up resistor R10 and this resistor is generated on connection signal line L3.

Whether connection detection circuit 312 is a limit switch or a resistor as described above, the potential generated on connection signal line L3 (namely, the potential of connection signal CNCT) varies between when connector 310 is connected to and disconnected from inlet 270. Accordingly, vehicle-side ECU 170 can detect a connection state of connector 310 by detecting the potential of connection signal line L3.

In vehicle 10, vehicle-side ECU 170 includes, in addition to power supply node 511 and pull-up resistor R10 described above, a resistance circuit 502, input buffers 504 and 506, and a CPU 508. Input buffers 504 and 506 are included in memory 171 of FIG. 2.

Resistance circuit 502 includes pull-down resistors R1, R2, and switches SW1, SW2. Pull-down resistor R1 and switch SW1 are connected in series between control pilot line L1 through which pilot signal CPLT is communicated and a vehicle ground 512. Pull-down resistor R2 and switch SW2 are also connected in series between control pilot line L1 and vehicle ground 512. Switches SW1 and SW2 are controlled such that they are rendered conducting or non-conducting in accordance with control signals S1 and S2 from CPU 508, respectively.

This resistance circuit 502 is a circuit for controlling the potential of pilot signal CPLT from the vehicle 10 side.

Input buffer 504 receives pilot signal CPLT on control pilot line L1, and outputs received pilot signal CPLT to CPU 508. Input buffer 506 receives connection signal CNCT from connection signal line L3 which is connected to connection detection circuit 312 of connector 310, and outputs received connection signal CNCT to CPU 508. A voltage is applied to connection signal line L3 from vehicle-side ECU 170 as described above, and the potential of connection signal CNCT varies when connector 310 is connected to inlet 270. CPU 508 detects a connection state of connector 310 by detecting the potential of this connection signal CNCT.

CPU 508 receives pilot signal CPLT and connection signal CNCT from input buffers 504 and 506, respectively.

CPU 508 detects a connection state of connector 310 by detecting the potential of connection signal CNCT.

CPU 508 detects the rated current of charging cable 300 as described above by detecting an oscillation state and duty cycle of pilot signal CPLT.

CPU 508 controls the potential of pilot signal CPLT by controlling control signals S1 and S2 for switches SW1 and SW2 based on the potential of connection signal CNCT and the oscillation state of pilot signal CPLT. As such, CPU 508 can remotely control relay 332. Then, electric power is supplied from system power supply 402 to vehicle 10 through charging cable 300.

Referring to FIGS. 2 and 3, when the contacts of CCID relay 332 are closed, AC power from system power supply 402 is supplied to power conversion device 160, to complete preparation for charging of power storage device 150 from system power supply 402. CPU 508 outputs control signal PWE to power conversion device 160, to convert the AC power from system power supply 402 to DC power capable of charging power storage device 150. CPU 508 outputs control signal SE to close the contacts of relay 155, to perform charging of power storage device 150.

Figure 4:
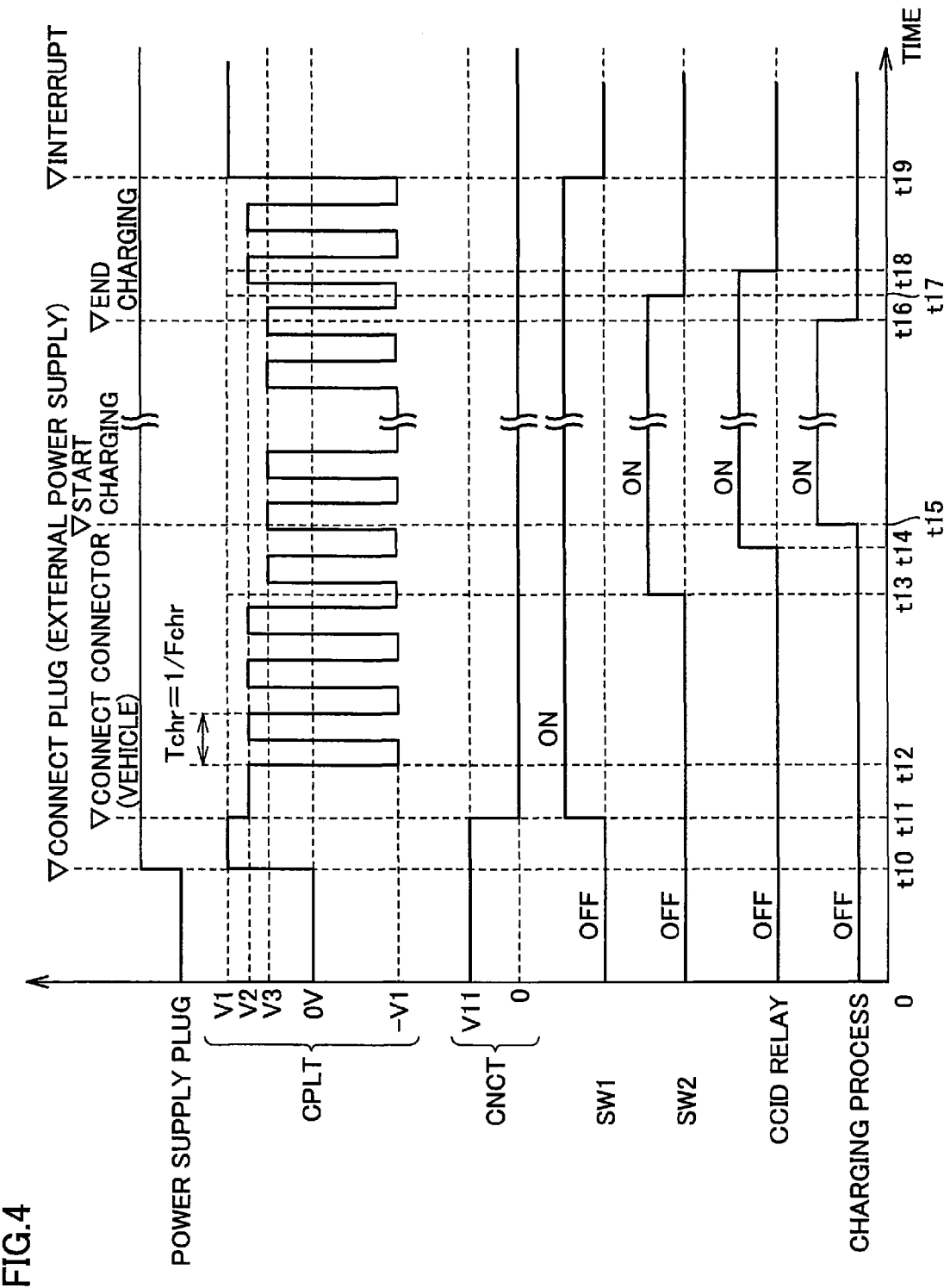
FIG. 4 is a time chart illustrating a sequence of external charging.

FIG. 4 is a time chart illustrating a sequence of external charging by the charging system of FIG. 3. In FIG. 4, a horizontal axis represents time, and a vertical axis represents a connection state of plug 320, a potential of pilot signal CPLT, a potential of connection signal CNCT, states of switches SW1 and SW2, a state of CCID relay 332, and a state of a charging process.

Referring to FIGS. 3 and 4, until time t10, charging cable 300 is not connected to either vehicle 10 or system power supply 402. In this state, switches SW1, SW2 and CCID relay 332 are off, and pilot signal CPLT has a potential of 0V. Connection signal CNCT has a potential of V11 (>0V).

When plug 320 of charging cable 300 is connected to outlet 400 of system power supply 402 at time t10, control pilot circuit 334 receives electric power from system power supply 402 and generates pilot signal CPLT.

At this time t10, connector 310 of charging cable 300 has not yet been connected to inlet 270. Pilot signal CPLT has a potential of V1 (e.g., 12V), and pilot signal CPLT is not oscillating.

When connector 310 is connected to inlet 270 at time t11, the connection detection circuit 312 detects the potential of connection signal CNCT decreases.

When the decrease in potential of connection signal CNCT is detected, CPU 508 detects connection between connector 310 and inlet 270. Accordingly, control signal S1 is activated by CPU 508 to turn switch SW1 on. Then, the potential of pilot signal CPLT decreases to V2 (e.g., 9V) by pull-down resistor R1 of resistance circuit 502.

At time t12, CCID control unit 610 detects that the potential of pilot signal CPLT has decreased to V2. Accordingly, CCID control unit 610 causes pilot signal CPLT to oscillate in an oscillation cycle Tchr. (=1/Fchr). It is noted that Fchr represents an oscillation frequency.

When the oscillation of pilot signal CPLT is detected, CPU 508 detects the rated current of charging cable 300 from the duty of pilot signal CPLT as described above.

Then, CPU 508 activates control signal S2 to turn switch SW2 on so as to start charging operation. Accordingly, the potential of pilot signal CPLT decreases to V3 (e.g., 6V) by pull-down resistor R2 (time t13 in FIG. 4).

When this decrease to V3 in potential of pilot signal CPLT is detected by CCID control unit 610, at time t14, the contacts of CCID relay 332 are closed, and the electric power from system power supply 402 is supplied to vehicle 100 through charging cable 300.

Then, when AC voltage VAC is detected in vehicle 10, CPU 508 closes the contacts of relay 155 (FIG. 2) and controls power conversion device 160 (FIG. 2), to start charging of power storage device 150 (FIG. 2) (time t15 in FIG. 4).

When the charging of power storage device 150 continues and it is detected that power storage device 150 has been fully charged, CPU 508 ends the charging process (time t16 in FIG. 4). Then, CPU 508 deactivates control signal S2 to render switch SW2 non-conducting (time t17 in FIG. 4). Accordingly, the potential of pilot signal CPLT becomes V2, causing the charging process to stop and rendering CCID relay 332 non-conducting (time t18), to complete the charging operation. Then, CPU 508 deactivates control signal S1 to render switch SW1 non-conducting, to interrupt the system.

In vehicle 100 having the configuration as described above, charging is started in accordance with the sequence as shown in FIG. 4 when plug 320 and outlet 400 are connected together and connector 310 and inlet 270 are connected together, and when a reservation for external charging has not been made. That a reservation for external charging has not been made means that a charging schedule is not stored in either memory 171 of vehicle-side ECU 170 or memory 407 of house-side ECU 406. In this embodiment, the charging schedule includes a time to start the external charging (hereinafter referred to as a start time) and a time to end the external charging (hereinafter referred to as an end time).

When a reservation for external charging has been made, on the other hand, charging is not immediately started but started based on the start time included in the charging schedule even when plug 320 and outlet 400 are connected together and connector 310 and inlet 270 are connected together. That a reservation for external charging has been made means that a charging schedule is stored in at least one of memory 171 of vehicle-side ECU 170 and memory 407 of house-side ECU 406.

The user makes a reservation for external charging by inputting information about a charging schedule to at least one of input unit 176 of vehicle 100, input unit 410 of house 450, terminal 4 and mobile terminal 6 (hereinafter referred to as a plurality of devices).

However, when pieces of information about a plurality of charging schedules are input to the plurality of devices, it is challenging to determine how to handle the plurality of charging schedules based on those pieces of information. In this embodiment, the plurality of charging schedules include charging schedules that have been input to at least two more devices, respectively.

In this embodiment, therefore, when pieces of information about a plurality of charging schedules are input to the plurality of devices, vehicle-side ECU 170 performs a process of charging power storage device 150 in accordance with a piece of information about the latest charging schedule out of the input pieces of information about the plurality of charging schedules.

Figure 5:
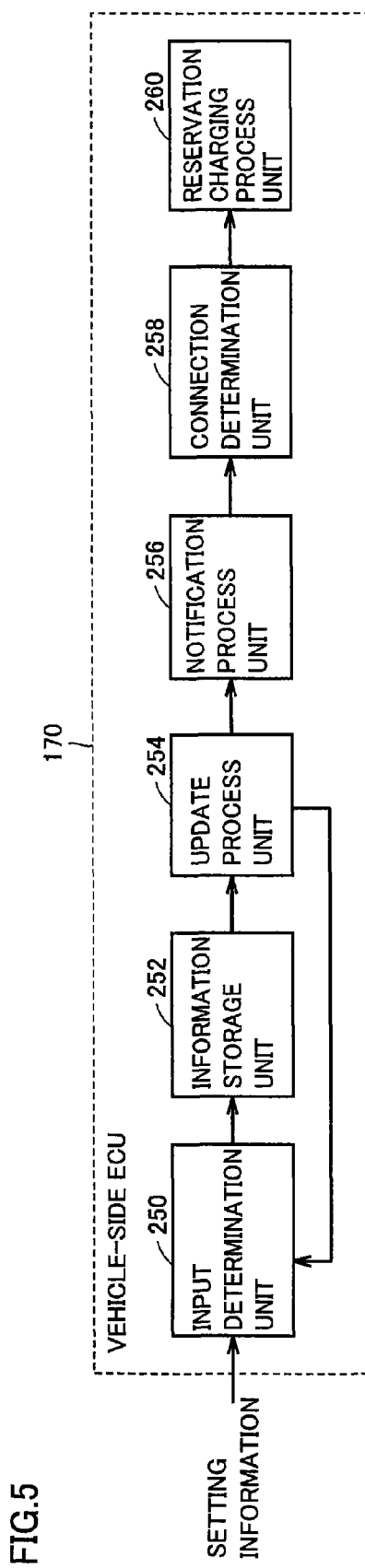
FIG. 5 is a functional block diagram of a vehicle-side ECU.

FIG. 5 is a functional block diagram of vehicle-side ECU 170 in this embodiment. Vehicle-side ECU 170 includes an input determination unit 250, an information storage unit 252, an update process unit 254, a notification process unit 256, a connection determination unit 258, and a reservation charging process unit 260.

Input determination unit 250 determines whether or not setting information has been input to any of the plurality of devices. Input determination unit 250 determines that setting information has been input when, for example, a start time or an end time of external charging has been input to input unit 176 of vehicle 10. Input determination unit 250 determines that setting information has been input when information about a charging schedule is received from terminal 4, mobile terminal 6 and house 450, or when a charging schedule is created based on information received from terminal 4, mobile terminal 6 and house 450 or information input to input unit 176.

Input determination unit 250 may determine whether or not received data is setting information by referring to a header of the data, for example. If it is determined that setting information has been input, input determination unit 250 may turn an input determination flag on.

If input determination unit 250 determines that setting information has been input, information storage unit 252 causes memory 171 to store a charging schedule determined based on the input setting information. A method of determining a charging schedule based on the setting information is as described above, and thus the detailed description thereof will not be repeated. Information storage unit 252 causes memory 171 to store the charging schedule while associating the setting information with a date, time and the like stored in memory 171. If the input determination flag is on, for example, information storage unit 252 may cause memory 171 to store a charging schedule based on the input setting information.

Update process unit 254 performs a process of updating the charging schedule. In this embodiment, update process unit 254 performs the process of updating the charging schedule after each passage of a prescribed period of time. For example, update process unit 254 may perform the process of updating the charging schedule after passage of a prescribed period of time since it was first determined that the setting information was input (namely, since the input determination flag was turned on). In this case, update process unit 254 may turn the input determination flag off after completion of the update process.

If reservation information for external charging has not been determined, for example, update process unit 254 determines a stored charging schedule as reservation information. If reservation information has been determined, for example, update process unit 254 updates the reservation information using the latest charging schedule. If reservation information has been determined and a plurality of charging schedules are stored in memory 171, for example, update process unit 254 determines the latest charging schedule as new reservation information.

Specifically, update process unit 254 replaces the current reservation information with new reservation information, which is the last stored charging schedule out of a plurality of charging schedules received by being stored in memory 171. Update process unit 254 specifies the last stored charging schedule based on the dates and times associated with the charging schedules in information storage unit 252, for example. Update process unit 254 specifies the latest charging schedule in the order of receipt out of a plurality of charging schedules received over a prescribed period of time as the last stored charging schedule.

When update process unit 254 determines the reservation information, notification process unit 256 performs a process of notifying the user that the reservation information has been determined and of the contents of the reservation information. Specifically, notification process unit 256 uses notification unit 178 to notify the user that the reservation information has been determined and of the contents of the reservation information. Alternatively, notification process unit 256 uses notification unit 412 of house 450 to transmit to house 450 a signal for making a notification that the reservation information has been determined and of the contents of the reservation information. Alternatively, notification process unit 256 transmits to terminal 4 and/or mobile terminal 6 a signal for causing a notification device (e.g., a display device) of terminal 4 and/or mobile terminal 6 to make a notification that the reservation information has been determined and of the contents of the reservation information. For example, notification process unit 256 may transmit an email containing information that the reservation information has been determined and the contents of the reservation information to a mail address registered in advance by the user. When vehicle 10 and house 450 are connected together by charging cable 300, notification process unit 256 may transmit to house 450 a signal for notifying the user that the reservation information has been determined and the like by using notification unit 412 through charging cable 300.

Connection determination unit 258 determines whether or not charging cable 300 is being connected to each of vehicle 10 and house 450. Specifically, vehicle-side ECU 170 determines that charging cable 300 is being connected when plug 320 and outlet 400 are connected together and connector 310 and inlet 270 are connected together. A method of determining whether or not charging cable 300 is being connected is as described above, and thus the detailed description thereof will not be repeated. If it is determined that charging cable 300 is being connected, connection determination unit 258 may turn a connection determination flag on, for example.

If connection determination unit 258 determines that charging cable 300 is being connected, reservation charging process unit 260 performs a process of conducting external charging of power storage device 150 in accordance with the determined reservation information (hereinafter referred to as a reservation charging process).

Reservation charging process unit 260 may perform external charging of power storage device 150 in accordance with the determined reservation information. That is, reservation charging process unit 260 may charge power storage device 150 if the current time matches a start time included in the reservation information.

Alternatively, reservation charging process unit 260 may transmit the determined reservation information to house-side ECU 406 when connection determination unit 258 determines that charging cable 300 is being connected. House-side ECU 406 may cause vehicle-side ECU 170 to perform external charging of power storage device 150 in accordance with the received reservation information. That is, if the current time matches a start time included in the reservation information, house-side ECU 406 may cause vehicle-side ECU 170 to charge power storage device 150. By managing the execution of external charging in accordance with the reservation information in house-side ECU 406 in this manner, a charging and discharging schedule of power storage device 150 in consideration of a state of power supply to the other electrical devices in house 450 can be managed appropriately.

Operation of vehicle-side ECU 170 when power storage device 150 is charged is as described above, and thus the detailed description thereof will not be repeated.

Although each of input determination unit 250, information storage unit 252, update process unit 254, notification process unit 256, connection determination unit 258, and reservation charging process unit 260 is described as functioning as software that is implemented when the CPU of vehicle-side ECU 170 executes a program stored in memory 171 in this embodiment, they may be implemented by hardware. Such a program is recorded in a storage medium and mounted on vehicle 10.

Figure 6:
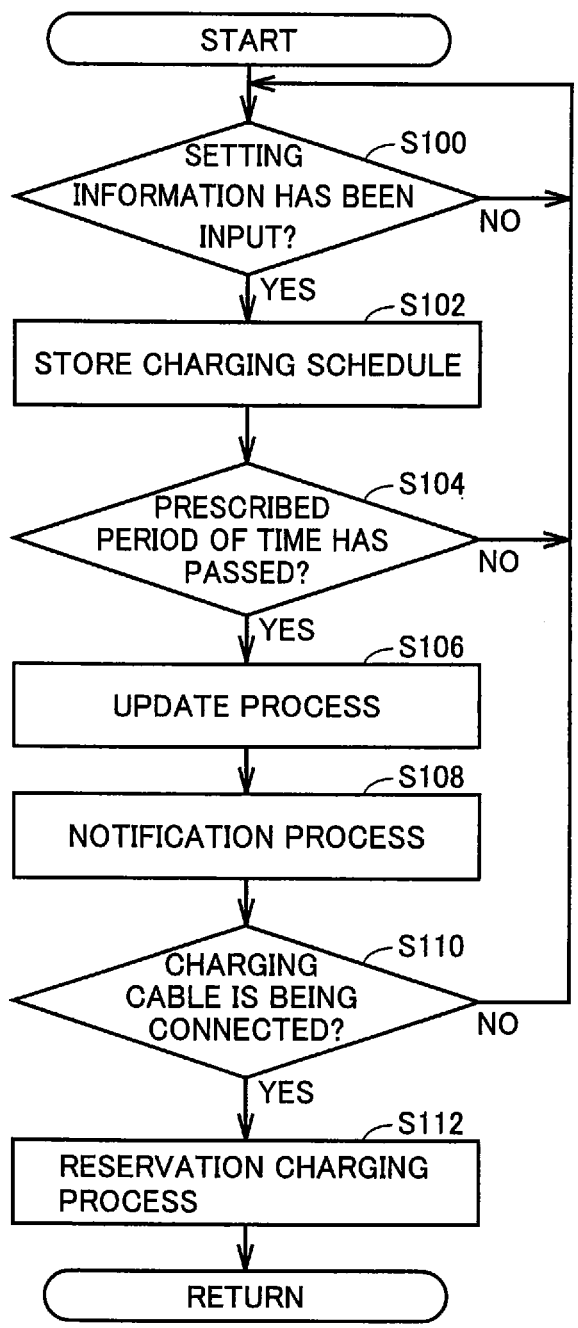
FIG. 6 is a flow chart illustrating a control structure of a program for performing a process of updating reservation information.

Referring to FIG. 6, a control structure of a program for adjusting a plurality of charging schedules performed by vehicle-side ECU 170 in this embodiment will be described.

In step (step is hereinafter referred to as S) 100, vehicle-side ECU 170 determines whether or not setting information has been input. If setting information has been input (YES in S100), the process proceeds to S102. If not (NO in S100), the process ends.

In S102, vehicle-side ECU 170 causes memory 171 to store a charging schedule determined based on the input setting information. In S104, vehicle-side ECU 170 determines whether or not a prescribed period of time has passed since the previous update process was performed. When the prescribed period of time has passed since the previous update process was performed (YES in S104), the process proceeds to S106. If not (NO in S104), the process returns to S100.

In S106, vehicle-side ECU 170 performs an update process to determine reservation information. In S108, vehicle-side ECU 170 performs a notification process to notify the user that the reservation information has been determined and of the contents of the reservation information.

In S110, vehicle-side ECU 170 determines whether or not charging cable 300 is being connected. If charging cable 300 is being connected (YES in S110), the process proceeds to S112. If not (NO in S110), the process returns to S100. In S112, vehicle-side ECU 170 performs a reservation charging process.

Figure 7:
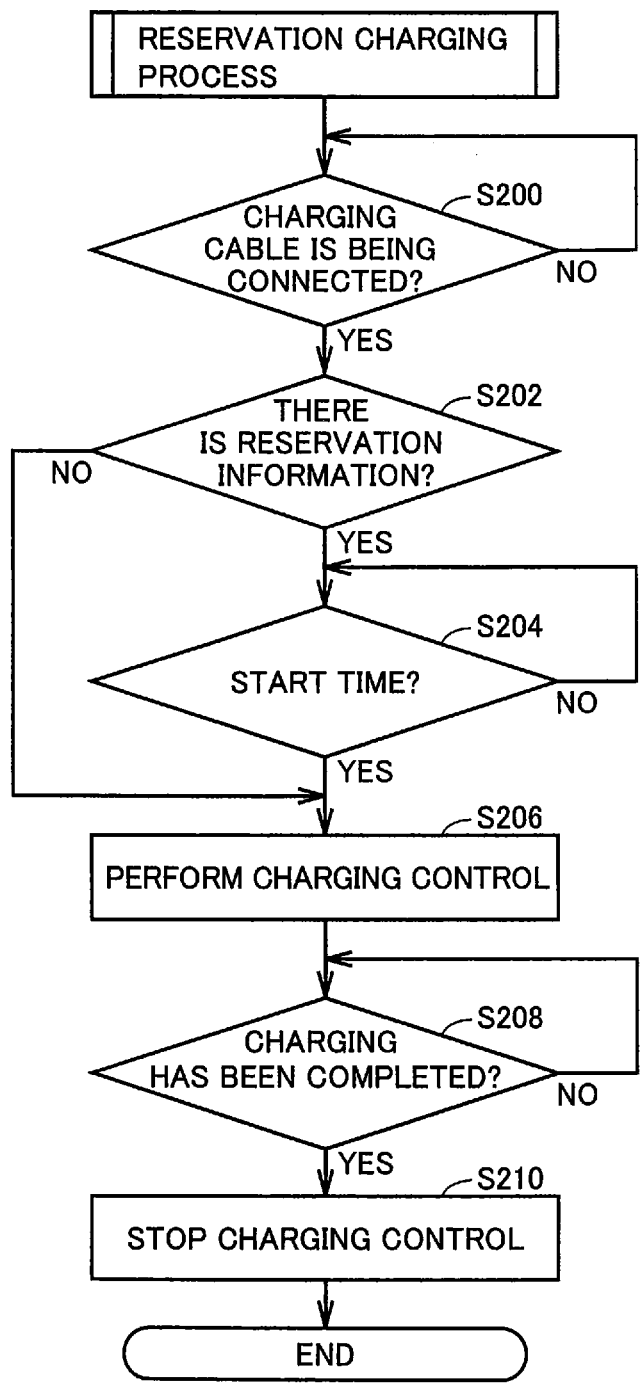
FIG. 7 is a flow chart illustrating a control structure of a program for performing a reservation charging process.

Referring now to FIG. 7, a control structure of a program for performing external charging in accordance with reservation information will be described. Although vehicle-side ECU 170 is described as managing a charging schedule and performing external charging in accordance with reservation information in this embodiment, house-side ECU 406 may manage a charging schedule and cause vehicle-side ECU 170 to perform external charging in accordance with the reservation information as described above.

In S200, vehicle-side ECU 170 determines whether or not charging cable 300 is being connected to each of vehicle 10 and house 450. A determination method is as described above in S108, and thus the detailed description thereof will not be repeated.

If charging cable 300 is being connected (YES in S200), the process proceeds to S202. If not (NO in S200), the process returns to S200.

In S202, vehicle-side ECU 170 determines whether or not reservation information has been determined. If reservation information has been determined (YES in S202), the process proceeds to S204. If not (NO in S202), the process proceeds to S206.

In S204, vehicle-side ECU 170 determines whether or not the current time matches a start time of the reservation information. If the current time matches the start time (YES in S204), the process proceeds to S206. If not (NO in S204), the process returns to S204.

In S206, vehicle-side ECU 170 performs charging control. Specifically, vehicle-side ECU 170 closes CCID relay 332 and activates power conversion device 160, to perform external charging of power storage device 150.

In S208, vehicle-side ECU 170 determines whether or not the charging has been completed. For example, vehicle-side ECU 170 may determine that the charging has been completed when the current time is an end time. Alternatively, vehicle-side ECU 170 may determine that the charging has been completed when the SOC of power storage device 150 becomes equal to or higher than a threshold value corresponding to a fully charged state. If the charging has been completed (YES in S208), the process proceeds to S210. If not (NO in S208), the process returns to S208.

Although the charging is described as being completed when the SOC of power storage device 150 becomes equal to or higher than the threshold value corresponding to the fully charged state in this embodiment, the charging may be completed when the SOC of power storage device 150 becomes equal to or higher than a threshold value determined by the user's request.

In S210, vehicle-side ECU 170 stops the charging control. Specifically, vehicle-side ECU 170 stops the operation of power conversion device 160 and renders CCID relay 332 non-conducting.

Operation of vehicle-side ECU 170 in this embodiment based on the structure and flow chart as described above will be described with reference to FIG. 8.

Figure 8:
FIG. 8 is a diagram illustrating operation of the process of updating reservation information.

A reservation table shown in FIG. 8 includes items of a receipt number, a start time and an end time. The receipt number indicates a position in the order of receipt of the setting information. If reservation information has been determined, it is stored in a head region of the reservation table. The reservation table shown in FIG. 8 is merely exemplary and the use of such a reservation table is not particularly limiting. Reservation information and a received charging schedule may be stored separately, for example.

It is assumed, for example, that the reservation table as shown on the left side of FIG. 8 is stored in memory 171 of vehicle-side ECU 170. In the reservation table on the left side of FIG. 8, a charging schedule including a start time of 23:00 and an end time of 5:00 is stored as reservation information. It is assumed that charging cable 300 is not being attached to vehicle 10.

When the user inputs setting information including a start time of 22:30 to terminal 4, for example, the setting information is transmitted from terminal 4 to vehicle 10. The setting information may be transmitted directly from terminal 4 to vehicle 10, or may be transmitted via information network 2.

When vehicle 10 receives the setting information (YES in S100), vehicle-side ECU 170 determines a charging schedule including a start time of 22:30 and an end time of 4:30 based on the received setting information. Vehicle-side ECU 170 stores the determined charging schedule in a region corresponding to receipt number 1 (S102).

When a prescribed period of time has not passed since the previous update process was completed (NO in S104), and when the user inputs new setting information including a start time of 22:00 to mobile terminal 6, for example, the setting information is transmitted from mobile terminal 6 to vehicle 10.

When vehicle 10 receives the setting information (YES in S100), vehicle-side ECU 170 determines a charging schedule including a start time of 22:00 and an end time of 4:00 based on the received setting information. Vehicle-side ECU 170 stores the determined charging schedule in a region corresponding to receipt number 2 (S102).

When the prescribed period of time has passed since the previous update process was completed (YES in S104), this update process is performed (S106). In the update process, the latest charging schedule out of the plurality of charging schedules is determined as new reservation information. In FIG. 8, the charging schedule of receipt number 2 which is newer than the charging schedule of receipt number 1 is selected as the latest charging schedule.

That is, the reservation information is rewritten as the charging schedule including a start time of 22:00 and an end time of 4:00, and the charging schedules corresponding to receipt number 1 and receipt number 2 are erased.

When the reservation information is determined, vehicle-side ECU 170 performs a display process of displaying the determination of the reservation information and the contents of the reservation information (S108). In this case, vehicle-side ECU 170 may control notification unit 178 such that notification unit 178 displays the contents described above, or may transmit a signal for displaying the contents described above to house 450, terminal 4 or mobile terminal 6. In response to this signal from vehicle-side ECU 170, house 450, terminal 4 or mobile terminal 6 causes notification unit 412 or the display device included in or terminal 4 or mobile terminal 6 to display the contents described above.

When vehicle 10 and house 450 are connected together by charging cable 300 (YES in S110), a reservation charging process is performed (S112).

Vehicle-side ECU 170 performs external charging in accordance with the reservation information when charging cable 300 is connected.

That is, if charging cable 300 is being connected (YES in S200), and if reservation information has been determined (YES in S202), it is determined whether or not the current time matches a start time of the reservation information (S204).

If the current time matches the start time (YES in S204), charging control is performed (S206). It is determined that the charging has been completed when the SOC of power storage device 150 reaches the value corresponding to a fully charged state (YES in S208), and the charging control is stopped (S210).

As described above, according to the vehicle of this embodiment, external charging of vehicle-mounted power storage device 150 can be performed in accordance with the latest charging schedule out of the plurality of charging schedules received from the plurality of devices, to thereby perform charging in accordance with a charging schedule intended by the user. As a result, a vehicle, a charging apparatus and a charging system performing charging control of a vehicle-mounted power storage device using an external power supply by appropriately adjusting charging schedules created in a plurality of devices can be provided.

<Variation (No. 1) of Update Process>

Although update process unit 254 was described as selecting the last stored charging schedule out of a plurality of charging schedules as the latest charging schedule in this embodiment, this is not particularly limiting.

For example, update process unit 254 may determine a charging schedule based on the last generated setting information out of a plurality of charging schedules as new charging information. For example, update process unit 254 specifies the last generated setting information based on dates and times when the setting information was input to at least one of input unit 176, terminal 4, mobile terminal 6 and house 450. The dates and times when the setting information was input may be included in the setting information at the time of input to each device. For example, update process unit 254 may determine, out of a plurality of charging schedules (or setting information) received over a prescribed period of time, a charging schedule of the latest date and time when the schedule was created (or a charging schedule based on the setting information) as the last created charging schedule.

For example, the process of updating the charging schedule may be performed using a reservation table shown in FIG. 9. The reservation table shown in FIG. 9 is different from the reservation table shown in FIG. 8 in that it further includes a date and time when the setting information was input (hereinafter referred to as a date and time of input).

It is assumed, for example, that the user input information for specifying a charging schedule including a start time of 22:00 and an end time of 4:00 to mobile terminal 6 at 14:00 on December 1. It is also assumed that the user input information for specifying a charging schedule including a start time of 22:30 and an end time of 4:30 to terminal 4 at 17:00 on December 1.

Furthermore, it is assumed that, due to a communication delay caused by the occurrence of a failure of a communication line between mobile terminal 6 and vehicle 10 at the time of input of the information for specifying setting information to mobile terminal 6, the setting information from mobile terminal 6 was received after the setting information from terminal 4 was received.

In this case, in the reservation table of FIG. 9, the charging schedule corresponding to receipt number 1 is a charging schedule based on the setting information that has been input to terminal 4, and the charging schedule corresponding to receipt number 2 is a charging schedule based on the setting information that has been input to mobile terminal 6.

In such a case, in the update process, the charging schedule of receipt number 1 based on the setting information that has been input to terminal 4 is selected as the latest charging schedule based on the dates and times of input in the reservation table.

That is, the reservation information is rewritten as the charging schedule including a start time of 22:30 and an end time of 4:30, and the charging schedules corresponding to receipt number 1 and receipt number 2 are erased.

As such, a charging schedule based on setting information last input by the user out of a plurality of charging schedules can be selected as the latest schedule.

<Variation (No. 2) of Update Process>

In Variation (No. 1) of Update Process described above, if the latest charging schedule out of a plurality of charging schedules is unclear, for example, vehicle-side ECU 170 may select a charging schedule that has been set in vehicle 10 to determine reservation information. That the latest charging schedule a is unclear means that, when the last created charging schedule is determined as the latest charging schedule, at least one charging schedule out of a plurality of received charging schedules does not include information about a date and time of creation. Alternatively, that the latest charging schedule a is unclear means that, when the last received charging schedule is determined as the latest charging schedule, the order of receipt of charging schedules is unclear in vehicle-side ECU 170.

The charging schedule that has been set in vehicle 10 includes a charging schedule determined based on setting information that has been input to input unit 176 of vehicle 10 by the user, and a charging schedule determined by vehicle-side ECU 170 based on a state of vehicle 10 which is different from a request by the user. The charging schedule based on a state of vehicle 10 will be described later.

Figure 10:
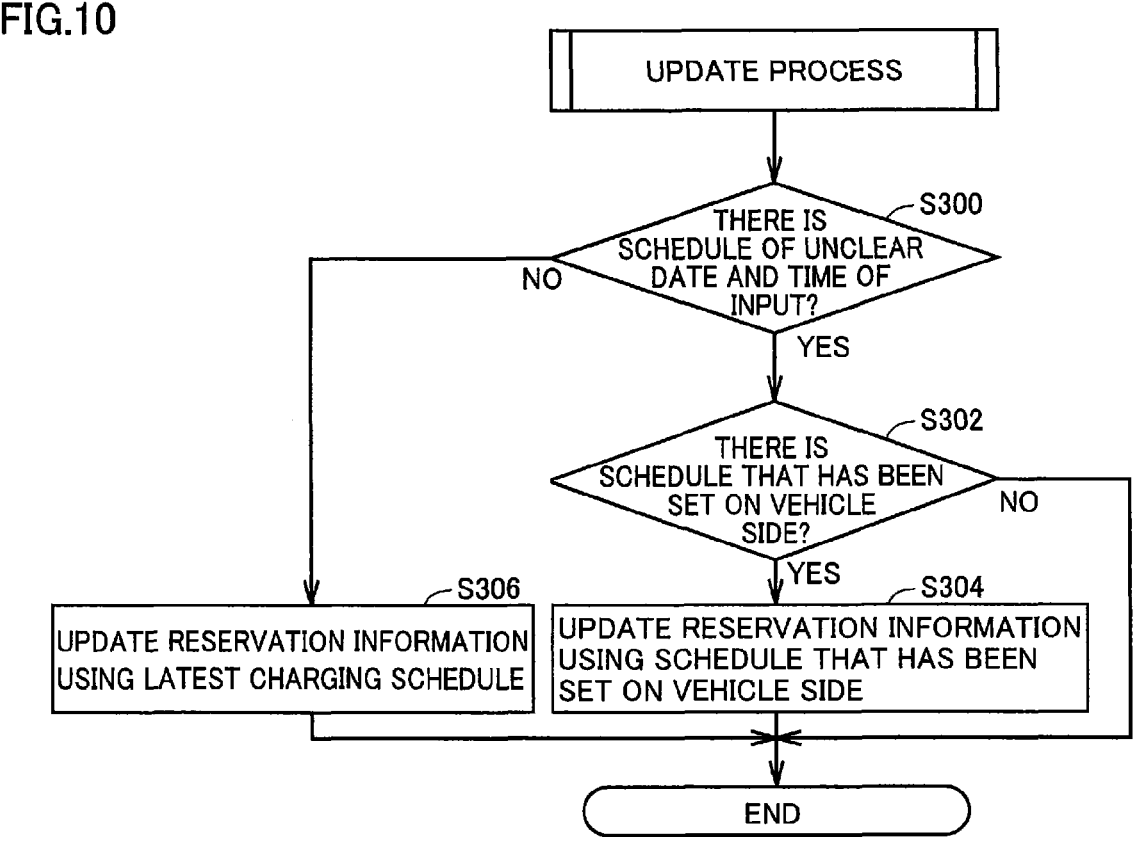
FIG. 10 is a flow chart illustrating a variation (No. 2) of the update process.

Referring to FIG. 10, a control structure of a program of the update process when the date and time of input of a charging schedule is unclear, which is performed by vehicle-side ECU 170, will be described. A flow chart of FIG. 10 illustrates detailed contents of the update process at S106 in the flow chart of FIG. 6.

In S300, vehicle-side ECU 170 determines whether or not a charging schedule of an unclear date and time of input is stored in the reservation table for external charging. If a charging schedule of an unclear date and time of input is stored in the reservation table for external charging (YES in S300), the process proceeds to S302. If not (NO in S300), the process proceeds to S304.

In S302, vehicle-side ECU 170 determines whether or not there is a charging schedule that has been set on the vehicle 10 side in the reservation table. When vehicle-side ECU 170 writes a charging schedule into the reservation table, the schedule is written while being associated with an attribute indicating that it has been set on the vehicle 10 side, for example. Vehicle-side ECU 170 determines, based on the attribute written into the reservation table, whether or not a charging schedule associated with the attribute has been set on the vehicle 10 side. This determination method is merely exemplary and is not limiting.

If there is a charging schedule that has been set on the vehicle 10 side in the reservation table (YES in S302), the process proceeds to S304. If not (NO in S302), the process ends.

In S304, vehicle-side ECU 170 updates the reservation information using the charging schedule that has been set on the vehicle 10 side. In S306, vehicle-side ECU 170 updates the reservation information using a charging schedule of the latest date and time of input.

Operation of vehicle-side ECU 170 based on the flow chart shown in FIG. 10 will be described. It is assumed that, when a charging schedule is set on the vehicle 10 side, a date and time of input is not stored.

When vehicle-side ECU 170 receives setting information that has been input to terminal 4, mobile terminal 6, input unit 176 of vehicle 10 or input unit 410 of house 450 (YES in S100), a charging schedule is determined based on the setting information. Vehicle-side ECU 170 stores the determined charging schedule in the region corresponding to receipt number 1 (S102). If the charging schedule has been set on the vehicle 10 side, vehicle-side ECU 170 associates the determined charging schedule with an attribute indicating that it has been set on the vehicle 10 side.

When the prescribed period of time has passed since the previous update process was completed (YES in S104), this update process is performed (S106).

In the update process, if there is a charging schedule of an unclear date and time of input out of charging schedules stored in the reservation table (YES in S300), and if there is a charging schedule that has been set on the vehicle 10 side (YES in S302), reservation information is determined using the charging schedule that has been set on the vehicle 10 side.

In the update process, if there is no charging schedule of an unclear date and time of input out of charging schedules stored in the reservation table (NO in S300), on the other hand, reservation information is determined using a charging schedule of the latest date and time of input.

As a result, when setting information is input to input unit 176 of vehicle 10, for example, even if the latest charging schedule is unclear, charging in accordance with a charging schedule based on a state of vehicle 10 can be performed, thereby ensuring that required charging is performed on vehicle 10.

<Variation (No. 3) of Update Process>

Although vehicle-side ECU 170 was described as updating the reservation information using the latest charging schedule out of the plurality of schedules even if the reservation information has already been determined, such operation is not particularly limiting.

For example, if a charging schedule based on a state of vehicle 10 and the latest charging schedule do not match, vehicle-side ECU 170 may notify the user of vehicle 10 that they do not match and inquire the user about update.

In this variation, if setting information is input, and if there is reservation information based on a state of vehicle 10, for example, vehicle-side ECU 170 may inquire the user about whether or not update of the reservation information is allowed. If a response that allows update of the reservation information is obtained from the user, vehicle-side ECU 170 may update the reservation information.

Vehicle-side ECU 170 determines, in addition to the reservation information determined by the user's input as described above, reservation information at a request based on a state of vehicle 10 which is different from a request by the user.

For example, vehicle-side ECU 170 may determine reservation information for performing external charging of power storage device 150 so as to warm up power storage device 150 by utilizing Joule heat generated by internal resistance in power storage device 150. For example, vehicle-side ECU 170 determines the reservation information for performing external charging for the warm-up purposes immediately before the start of use of vehicle 10 (e.g., a prescribed period of time in the early morning).

Furthermore, vehicle-side ECU 170 may determine reservation information for performing external charging so as to recover the SOC after making a diagnosis of abnormality or degradation of power storage device 150 by charging and discharging of power storage device 150.

Vehicle-side ECU 170 makes a diagnosis of abnormality or degradation of power storage device 150 based on a voltage, a usage history of power storage device 150 or a state of vehicle 10 including a travel history of vehicle 10. For example, vehicle-side ECU 170 makes a diagnosis of abnormality or degradation of power storage device 150 when the voltage of power storage device 150 falls below a threshold value, whenever a period of use of vehicle 10 becomes equal to or longer than a threshold value, or whenever a travel distance (travel period) becomes equal to or longer than a threshold value.

Vehicle-side ECU 170 makes a diagnosis of abnormality or degradation based on, for example, a state (current, voltage, SOC or the like) of power storage device 150 before and after reducing the SOC of power storage device 150 by a prescribed amount. Vehicle-side ECU 170 makes a diagnosis of abnormality or degradation based on, for example, a full charging capacity or variation between a previous value and a current value of the full charging capacity.

Thus, vehicle-side ECU 170 makes a reservation for external charging so as to recover the SOC of power storage device 150 that has decreased after the diagnosis of abnormality or degradation to a level before the diagnosis, for example. For example, vehicle-side ECU 170 makes a diagnosis of abnormality or degradation during a period when vehicle 10 is not used (e.g., between midnight and early morning), and determines the reservation information such that external charging is performed after the diagnosis.

Alternatively, vehicle-side ECU 170 may determine reservation information for performing external charging so as to perform a refreshing process of power storage device 150.

For example, vehicle-side ECU 170 performs the refreshing process by discharging power storage device 150 to reduce the SOC by a prescribed amount then charging power storage device 150. Power storage device 150 is discharged by using a resistor for discharge, motor generator 120 or the like. Vehicle-side ECU 170 determines the reservation information such that power storage device 150 is discharged during a period when vehicle 10 is not used and external charging is performed after the discharge, for example.

If reservation information is determined based on a state of vehicle 10, vehicle-side ECU 170 turns a reservation flag indicating the determination on. Alternatively, as described above, when vehicle-side ECU 170 writes a charging schedule into the reservation table, the charging schedule may be written while being associated with an attribute indicating that it has been set on the vehicle 10 side.

If reservation information is stored in memory 171 and if the reservation flag is on, vehicle-side ECU 170 determines that reservation information that has been determined based on a state of vehicle 10 is stored in memory 171.

Figure 11:
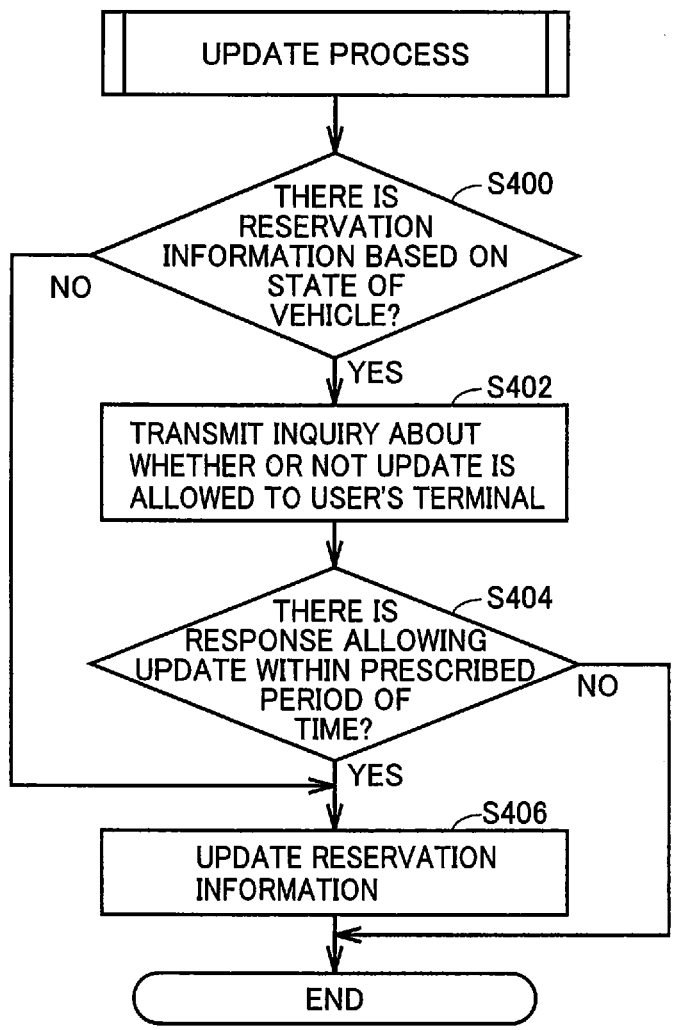
FIG. 11 is a flow chart illustrating a variation (No. 3) of the update process.

Referring to FIG. 11, a control structure of a program of the update process when there is reservation information based on a state of vehicle 10, which is performed by vehicle-side ECU 170, will be described. A flow chart of FIG. 11 illustrates detailed contents of the update process at S106 in the flow chart of FIG. 6.

In S400, vehicle-side ECU 170 determines whether or not reservation information based on a state of vehicle 10 is stored in memory 171. Specifically, if reservation information is stored in the reservation table and if the aforementioned reservation flag is on, vehicle-side ECU 170 determines that reservation information based on a state of vehicle 10 is stored in memory 171. If reservation information based on a state of vehicle 10 is stored in memory 171 (YES in S400), the process proceeds to S402. If not (NO in S400), the process proceeds to S406.

In S402, vehicle-side ECU 170 transmits an inquiry about whether or not update of the reservation information is allowed to the user's terminal. For example, vehicle-side ECU 170 transmits a signal for displaying an inquiry about whether or not update of the reservation information is allowed to the display device of terminal 4 or mobile terminal 6, notification unit 412 of house 450 or notification unit 178 of vehicle-side ECU 170. For example, vehicle-side ECU 170 may transmit an email inquiring about whether or not update of the reservation information is allowed to a mail address of the user.

In S404, vehicle-side ECU 170 determines whether or not there is a response that allows update of the reservation information from the user within a prescribed period of time since the transmission of the inquiry. The prescribed period of time is not particularly limited. It is only required that whether or not the reservation information is updated be determined before at least a start time of the reservation information based on a state of vehicle 10 or a start time based on the input setting information, whichever is earlier. If there is a response that allows update of the reservation information from the user within the prescribed period of time since the transmission of the inquiry (YES in S404), the process proceeds to S406. If not (NO in S404), the process shown in FIG. 11 ends and proceeds to S108 in the flow chart shown in FIG. 6.

In S406, vehicle-side ECU 170 updates the reservation information using the latest charging schedule. After S406, the process shown in FIG. 11 ends and proceeds to S108 in the flow chart shown in FIG. 6. The update of the reservation information using the latest charging schedule is as described above, and thus the detailed description thereof will not be repeated.

Operation of vehicle-side ECU 170 based on the flow chart shown in FIG. 11 will be described. For example, it is assumed that reservation information for performing external charging for the warm-up purposes for a prescribed period of time in the early morning (e.g., a start time of 4:00 and an end time of 5:00) is stored in memory 171. At this time, the reservation flag is on.

When vehicle 10 receives the setting information that has been input to terminal 4, mobile terminal 6 or house 450 (YES in S100), a charging schedule (e.g., a start time of 23:00 and an end time of 5:00) is calculated. Vehicle-side ECU 170 stores the calculated charging schedule in the region corresponding to receipt number 1 (S102).

When the prescribed period of time has passed since the previous update process was completed (YES in S104), this update process is performed (S106).

In the update process, since the reservation information based on a state of vehicle 10 is stored (YES in S400), vehicle-side ECU 170 transmits an inquiry about whether or not update of the reservation information is allowed to the user's terminal (S402).

In response to the inquiry about whether or not update of the reservation information is allowed, the user performs operation of allowing update of the reservation information on terminal 4, mobile terminal 6 or input unit 410 of house 450 within a prescribed period of time. When vehicle-side ECU 170 receives a signal based on this operation by the user from the terminal (YES in S404), vehicle-side ECU 170 determines the latest charging schedule as new reservation information (S406). If the operation of allowing update of the reservation information is not performed on each terminal within the prescribed period of time, on the other hand, the reservation information is not updated. That is, external charging is performed in accordance with the charging schedule based on a state of vehicle 10.

As such, the user can confirm whether or not the reservation information has been updated, thus preventing the occurrence of variance in the contents of reservation between the user's recognition and the reservation information.

Although an example where the setting information has been input and there is the reservation information based on a state of vehicle 10 was described as an example where a charging schedule based on a state of vehicle 10 and the latest charging schedule do not match in this embodiment, such an example is not particularly limiting.

An example where a charging schedule based on a state of vehicle 10 and the latest charging schedule do not match includes an example where at least the end times of the charging schedules do not match. Accordingly, if the end times match between a charging schedule based on a state of vehicle 10 and a charging schedule input by the user, vehicle-side ECU 170 may update the reservation information without making a notification to the user. If the start times match but the end times do not match between a charging schedule based on a state of vehicle 10 and a charging schedule input by the user, vehicle-side ECU 170 may notify the user that the charging schedules do not match.

<Variation (No. 4) of Update Process>

If there is not enough charging time when charging is performed in accordance with a charging schedule based on input setting information, vehicle-side ECU 170 may inquire the user about whether or not update of the reservation information is allowed. If a response that allows update of the reservation information is obtained from the user, vehicle-side ECU 170 may update the reservation information.

Figure 12:
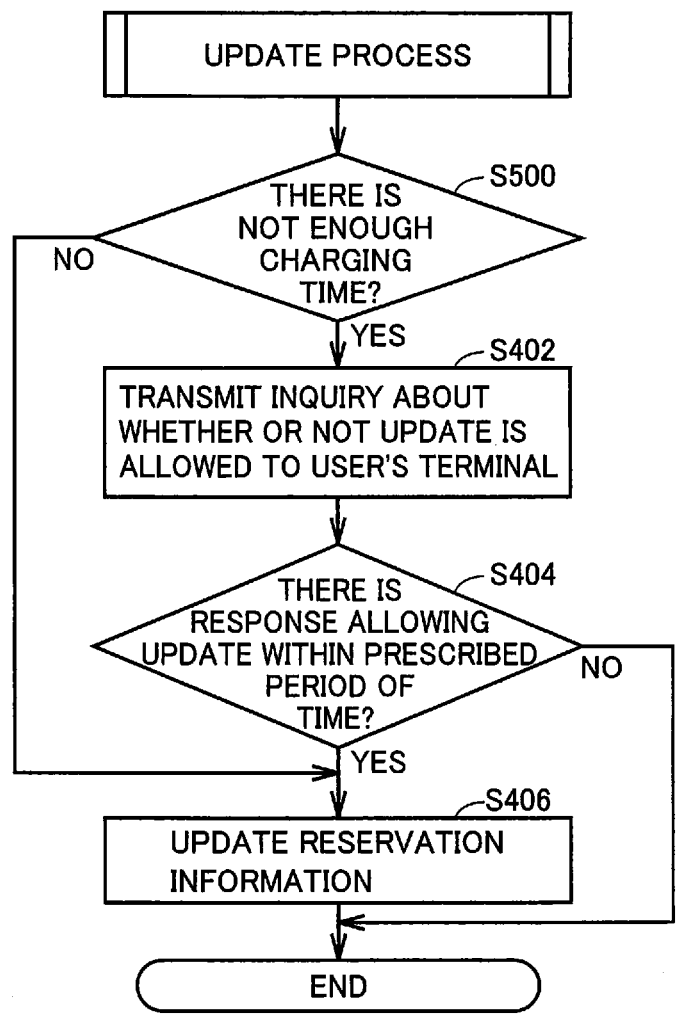
FIG. 12 is a flow chart illustrating a variation (No. 4) of the update process.

Referring to FIG. 12, a control structure of a program of the update process when there is not enough charging time, which is performed by vehicle-side ECU 170, will be described. A flow chart of FIG. 12 illustrates detailed contents of the update process at S106 in the flow chart of FIG. 6.

In the flow chart shown in FIG. 12, the process steps the same as those in the flow chart shown in FIG. 11 described above are designated by the same step numbers, and the processes thereof are also identical. Thus, the detailed description thereof will not be repeated.

In S500, vehicle-side ECU 170 determines whether or not there is not enough charging time. Vehicle-side ECU 170 determines that there is not enough charging time when, for example, a predicted value of a charged amount if external charging is performed from a start time to an end time that are included in the input setting information is smaller than a charged amount required to reach a target value (e.g., an SOC corresponding to a fully charged state) from the current SOC of power storage device 150. Alternatively, vehicle-side ECU 170 may determine that there is not enough charging time when a predicted value of a charged amount if external charging is performed from the current time to an end time that is included in the input setting information is smaller than a charged amount required to reach a target value from the current SOC of power storage device 150. The predicted value of the charged amount may be calculated by, for example, multiplying an upper limit value of charging power based on the specifications and the like of charging cable 300 with the charging time, or may be calculated with other well-known methods. If there is not enough charging time (YES in S500), the process proceeds to S402. If not (NO in S500), the process proceeds to S406.

Operation of vehicle-side ECU 170 based on the flow chart shown in FIG. 12 will be described.

When vehicle-side ECU 170 receives setting information that has been input to terminal 4, mobile terminal 6, input unit 176 of vehicle 10 or input unit 410 of house 450 (YES in S100), a charging schedule (e.g., a start time of 0:00 and an end time of 4:00) is calculated. Vehicle-side ECU 170 stores the calculated charging schedule in the region corresponding to receipt number 1 (S102).

When the prescribed period of time has passed since the previous update process was completed (YES in S104), this update process is performed (S106).

In the update process, it is determined whether or not there is not enough charging time based on a predicted value of a charged amount if external charging is performed in accordance with the calculated charging schedule and a charged amount required to reach a target value from the current SOC of power storage device 150 (S500). If the predicted value of the charged amount is smaller than the required charged amount, it is determined that there is not enough charging time (YES in S500), and thus vehicle-side ECU 170 transmits an inquiry about whether or not update of the reservation information is allowed to the user's terminal (S402).

In response to the inquiry about whether or not update of the reservation information is allowed, the user performs operation of allowing update of the reservation information on terminal 4, mobile terminal 6 or input unit 410 of house 450 within a prescribed period of time. When vehicle-side ECU 170 receives a signal based on this operation by the user from the terminal (YES in S404), vehicle-side ECU 170 determines the latest charging schedule as new reservation information (S406). If the operation of allowing update of the reservation information is not performed on each terminal within the prescribed period of time, the reservation information is not updated.

As such, the user can confirm whether or not the reservation information has been updated, thus preventing the occurrence of variance in the contents of reservation between the user's recognition and the reservation information.

Although the reservation information was described as being determined using the charging schedule that has been set on the vehicle 10 side when the setting information is transmitted from each device to vehicle-side ECU 170 to compile a charging schedule on the vehicle 10 side and when there is a charging schedule of an unclear date and time of input in Variations (No. 1) to (No. 4) of Update Process, the same applies when the setting information is transmitted from each device to house-side ECU 406 to compile a charging schedule on the house 450 side, or when the setting information is transmitted from each device to server device 3 to compile a charging schedule on the server device 3 side. Thus, the detailed description thereof will not be repeated.

<Time Correction Process>

If a difference occurs between times measured by the plurality of devices, vehicle-side ECU 170 performs a time correction process of correcting the times measured by the plurality of devices.

Figure 13:
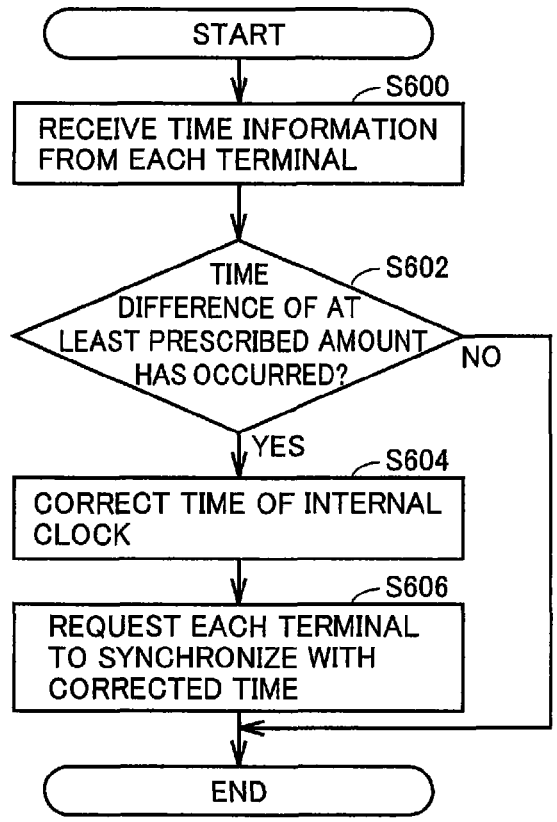
FIG. 13 is a flow chart illustrating a time correction process.

Referring to FIG. 13, a control structure of a program of the time correction process performed by vehicle-side ECU 170 will be described.

In S600, vehicle-side ECU 170 receives time information from the plurality of devices. The time information may include information about at least a time and minute measured by the device, but may include information about a year, month and day or about a second. Vehicle-side ECU 170 is only required to be able to receive the time information from at least one of the plurality of devices.

In S602, vehicle-side ECU 170 determines whether or not a time difference of at least a prescribed amount has occurred among the plurality of devices. For example, vehicle-side ECU 170 calculates a difference between the earliest time and the latest time out of the times measured by the plurality of devices, which include a time measured by itself, and determines that a time difference has occurred if the calculated difference is at least the prescribed amount. Vehicle-side ECU 170 may determine whether or not a time difference of at least the prescribed amount has occurred between at least two devices including itself. Thus, vehicle-side ECU 170 does not need to receive the time information from all of the plurality of devices.

If a time difference of at least the prescribed amount has occurred among the plurality of devices (YES in S602), the process proceeds to S604. If not (NO in S602), the process ends.

In S604, vehicle-side ECU 170 corrects a time measured by an internal clock. For example, vehicle-side ECU 170 may correct the time measured by the internal clock with a well-known technique. For example, vehicle-side ECU 170 may correct the time measured by the internal clock by receiving electric waves for time correction from outside of vehicle 10, or may correct the time measured by the internal clock by employing the GPS (Global Positioning System).

In S606, vehicle-side ECU 170 requests the plurality of devices to synchronize with the corrected time of the internal clock of vehicle-side ECU 170. For example, the plurality of devices may synchronize with the time measured by the internal clock based on the time information received from vehicle-side ECU 170, or the time of the internal clock may be corrected by receiving electric waves for time correction at each of the plurality of devices, or the time of the internal clock may be corrected by employing the GPS (Global Positioning System).

Operation of vehicle-side ECU 170 based on the flow chart shown in FIG. 13 will be described.

Vehicle-side ECU 170 receives the time information from each of the plurality of devices. If a time difference of at least the prescribed amount has occurred among the plurality of devices, vehicle-side ECU 170 corrects the time measured by its internal clock by utilizing electric waves for time correction from outside, the GPS or the like (S604). Vehicle-side ECU 170 requests the plurality of devices to synchronize with the corrected time.

This prevents the occurrence of variance in the contents between the charging schedule recognized by the user and the reservation information, which is caused by the time difference among the plurality of devices.

<Examples of Application to Other Configurations>

Although the charging schedule was described as being managed mainly by vehicle-side ECU 170 in this embodiment, the charging schedule is not particularly limited to be managed by vehicle-side ECU 170. For example, house-side ECU 406 may manage the charging schedule, or server device 3 may manage the charging schedule.

In particular, when house-side ECU 406 adjusts the charging schedule appropriately, a state of supply of electric power to the other electrical loads and a state of use of the electrical loads can be collectively managed in addition to the SOC of power storage device 150 of vehicle 10, thereby attaining efficient power management. For example, house-side ECU 406 allows charging and discharging of power storage device 150 within a range where the adjusted charging schedule is ensured.

As such, before external charging of power storage device 150 in accordance with the reservation information is performed, power storage device 150 can be used as an alternate power supply of system power supply 402. Accordingly, power storage device 150 can be charged in accordance with the charging schedule, and optimal power management can be attained using the electric power of power storage device 150.

Alternatively, before external charging of power storage device 150 in accordance with the reservation information is performed, power storage device 150 can be charged by another power supply such as a solar cell provided on a roof or the like of vehicle 10, or power storage device 150 can be discharged so as to utilize electrical devices in vehicle 10. Examples of the electrical devices utilized in vehicle 10 include an air conditioning apparatus provided in vehicle 10, a mobile terminal, a personal computer or a home appliance brought into vehicle 10.

In addition, although vehicle-side ECU 170 was described as managing the charging schedule in this embodiment, the present invention is not particularly limited to be applied to charging operation. For example, vehicle-side ECU 170 or house-side ECU 406 may manage a discharging schedule of power storage device 150.

The discharging schedule is created, for example, as part of the power management performed on the house 450 side. Specifically, the discharging schedule includes a start time and an end time for discharging control where power storage device 150 is used as an alternate power supply of system power supply 402. The discharging schedule may be determined by house-side ECU 406 based on a state of supply and demand of the electric power of system power supply 402, a state of use of the electrical devices and the like, or may be determined by input to at least one of the plurality of terminals of the user.

If a plurality of discharging schedules are created by input of setting information to the plurality of devices, vehicle-side ECU 170 or house-side ECU 406 may determine reservation information using the latest discharging schedule. As such, the discharging schedules created in the plurality of devices can be adjusted appropriately.

Figure 14:
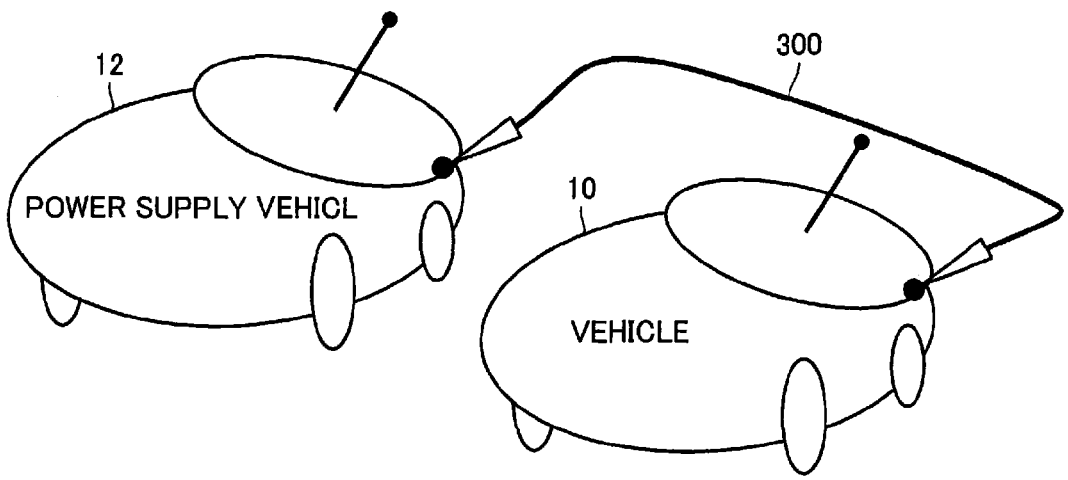
FIG. 14 is a diagram illustrating another configuration example of the charging system.

Furthermore, although charging system 1 was described as including vehicle 10 and house 450 functioning as a charging apparatus in this embodiment, such a configuration is not particularly limiting. For example, as shown in FIG. 14, vehicle 10 may be connected to a power supply vehicle 12 functioning as a charging apparatus of vehicle 10, instead of being connected to house 450. Power supply vehicle 12 may incorporate a DC power supply such as a battery or a capacitor, or may incorporate an AC power supply such as a power generator.

It should be understood that the embodiments disclosed herein are illustrative and non-restrictive in every respect. The scope of the present invention is defined by the terms of the claims, rather than the description above, and is intended to include any variations within the scope and meaning equivalent to the terms of the claims.

REFERENCE SIGNS LIST 1 charging system; 2 information network; 3 server device; 4 terminal; 6 mobile terminal; 10 vehicle; 12 power supply vehicle; 20 driving unit; 130 drive wheel; 140 engine; 145 power split device; 150 power storage device; 155, 332 relay; 160 power conversion device; 170 vehicle-side ECU; 171, 407 memory; 172, 404 PLC device; 174, 408 wireless communication device; 176, 410 input unit; 178, 412 notification unit; 180 motor driving device; 182, 604, 650 voltage sensor; 241, 341, 441, ACL1, ACL2 power line; 250 input determination unit; 252 information storage unit; 254 update process unit; 256 notification process unit; 258 connection determination unit; 260 reservation charging process unit; 270 inlet; 300 charging cable; 310 connector; 312 connection detection circuit; 320 plug; 334 control pilot circuit; 340 power line portion; 400 outlet; 402 system power supply; 406 house-side ECU; 414 switching unit; 416 electrical load; 450 house; 502 resistance circuit; 504, 506 input buffer; 511 power supply node; 512 vehicle ground; 602 oscillation device; 606 electromagnetic coil; 608 leakage detector; 610 CCID control unit; 660 current sensor.

The invention claimed is:

1. A vehicle comprising:
a rotating electric machine mounted on the vehicle;
a power storage device configured to supply electric power to the rotating electric machine; and
an electronic control unit configured to set a charging schedule of the power storage device, the setting of the charging schedule by the electronic control unit including:
receiving information about a charging schedule of the power storage device inputted by a user at each of a plurality of devices and creating a plurality of charging schedules based on the corresponding information inputted at each of the plurality of devices,
receiving from the plurality of devices information related to input times of when the user inputted the corresponding information about the charging schedule at each of the input devices, and
selecting the charging schedule corresponding to the latest input time as a latest charging schedule, and charging the power storage device via an external power supply in accordance with the latest charging schedule.

2. The vehicle according to claim 1, wherein
the electronic control unit performs, when a time measured by at least one of the plurality of devices is incorrect, a process of correcting the time.

3. The vehicle according to claim 1, wherein
the electronic control unit is configured to create a second charging schedule based on the state of the vehicle,
the first and second charging schedules include information associated with a charging start time and a charging end time, and
when the charging end time of the first charging schedule and the charging end time of the second charging schedule do not match, the electronic control unit is configured to inquire the user on whether an update of the charging schedule is allowed.

4. A charging apparatus configured to perform charging control on a power storage device of a vehicle via a power supply outside of the vehicle, the vehicle including a rotating electric machine and the power storage device configured to supply electric power to the rotating electric machine, the charging apparatus comprising:
an input device configured to receive information about a charging schedule of the power storage device input by a user at each of a plurality of devices; and
an electronic control unit configured to:
receive information about a charging schedule of the power storage device from the input device and create a plurality of charging schedules based on the information inputted at each of the plurality of devices,
receive from the plurality of devices information related to input times of when the user inputted the corresponding information about the charging schedule at each of the input devices, and
select the charging schedule corresponding to the latest input time as a latest charging schedule, and charge the power storage device via an external power supply in accordance with the latest charging schedule.

5. The charging apparatus according to claim 4, wherein
the charging apparatus is connected to the vehicle and an electrical device different from the vehicle, and
the electronic control unit performs the charging control on the power storage device in accordance with the latest charging schedule, and performs a process of managing supply and demand of electric power of the electrical device.

6. The charging apparatus according to claim 4, wherein
the electronic control unit is configured to create a second charging schedule based on the state of the vehicle,
the first and second charging schedules include information associated with a charging start time and a charging end time, and
when the charging end time of the first charging schedule and the charging end time of the second charging schedule do not match, the electronic control unit is configured to inquire the user on whether an update of the charging schedule is allowed.

7. The charging apparatus according to claim 6, wherein
the electronic control unit charges the power storage device in accordance with the second charging schedule when the latest charging schedule is unclear.

8. A charging system comprising:
a vehicle including: (i) a rotating electric machine, and (ii) a power storage device configured to supply electric power to the rotating electric machine;
a charging apparatus configured to charge the power storage device via a power supply located outside of the vehicle;
a plurality of input devices configured to receive information about a charging schedule of the power storage device from a user, and
an electronic control unit configured to:
receive the information about a charging schedule inputted by the user at each of the plurality of devices, and create a plurality of charging schedules based on the corresponding to the information inputted at each of the plurality of devices,
receive from the plurality of devices information related to input times of when the user inputted the corresponding information about the charging schedule at each of the input devices, and
select the charging schedule corresponding to the latest input time as a latest charging schedule, and charge the power storage device via an external power supply in accordance with the latest charging schedule.

9. The charging system according to claim 8, wherein
the electronic control unit is configured to create a second charging schedule based on the state of the vehicle,
the first and second charging schedules include information associated with a charging start time and a charging end time, and
when the charging end time of the first charging schedule and the charging end time of the second charging schedule do not match, the electronic control unit is configured to inquire the user on whether an update of the charging schedule is allowed.

* * * * *